United States Patent
Matsumiya et al.

(10) Patent No.: US 9,892,804 B2
(45) Date of Patent: Feb. 13, 2018

(54) NUCLEAR REACTOR CONTROL ROD WITH SIC FIBER REINFORCED STRUCTURE

(71) Applicant: Kabushiki Kaisha Toshiba, Minato-ku (JP)

(72) Inventors: Hiroshi Matsumiya, Yokohama (JP); Shinichi Higuchi, Chigasaki (JP); Koji Kitano, Yokohama (JP); Masaru Ukai, Yokohama (JP); Satoko Tajima, Yokohama (JP); Kenichi Yoshioka, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 74 days.

(21) Appl. No.: 14/430,955

(22) PCT Filed: Sep. 25, 2013

(86) PCT No.: PCT/JP2013/005676
§ 371 (c)(1),
(2) Date: Mar. 25, 2015

(87) PCT Pub. No.: WO2014/050094
PCT Pub. Date: Apr. 3, 2014

(65) Prior Publication Data
US 2015/0262719 A1    Sep. 17, 2015

(30) Foreign Application Priority Data

Sep. 26, 2012  (JP) .................................. 2012-212118
May 15, 2013  (JP) .................................. 2013-103415

(51) Int. Cl.
*G21C 7/113* (2006.01)
*G21C 7/10* (2006.01)
(Continued)

(52) U.S. Cl.
CPC ............. *G21C 7/113* (2013.01); *C04B 35/565* (2013.01); *C04B 35/806* (2013.01); *G21C 7/10* (2013.01);
(Continued)

(58) Field of Classification Search
CPC ......... G21C 7/113; G21C 7/10; C04B 35/565; C04B 35/806; C04B 2235/5244; C04B 2235/5268
(Continued)

(56) References Cited

U.S. PATENT DOCUMENTS 5,946,367 A     8/1999   Maruyama et al.
6,041,091 A *   3/2000   Ueda ...................... G21C 7/113
                                                         376/327

(Continued)

FOREIGN PATENT DOCUMENTS

JP    61 212792      9/1986
JP    62-130387 A    6/1987
(Continued)

OTHER PUBLICATIONS

Windes, "Structural Ceramic Composites for Nuclear Applications", INL/EXT-05-00652, Aug. 2005.*
(Continued)

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

A nuclear reactor control rod with SiC fiber reinforced structure comprises wing sections and a central joint section. Each of the wing sections is a flat plate spreading axially and radially, and includes storage tubes and a wing surface structural member. The storage tubes are arranged in parallel in a flat plane and contain a neutron absorbing member
(Continued)

containing the neutron absorbing material. The wing surface structural member is formed by molding of SiC/SiC composite material as to cover surfaces of the storage tubes and formed to have an outward shape of a flat plate. The central joint section and storage tubes are made of SiC/SiC composite material. The central joint section bundles the wing sections together at center. The storage tubes are bundled together with fibers made of SiC or a textile made of SiC.

10 Claims, 32 Drawing Sheets

(51) Int. Cl.
 C04B 35/565 (2006.01)
 C04B 35/80 (2006.01)
 G21C 21/18 (2006.01)
(52) U.S. Cl.
 CPC ...... *G21C 21/18* (2013.01); *C04B 2235/5244* (2013.01); *C04B 2235/5268* (2013.01); *Y02E 30/39* (2013.01)
(58) Field of Classification Search
 USPC .................................. 376/327, 353
 See application file for complete search history.

(56) References Cited

U.S. PATENT DOCUMENTS

| | | | |
|---|---|---|---|
| 6,246,740 B1* | 6/2001 | Maruyama | G21C 7/10 376/327 |
| 9,620,251 B2* | 4/2017 | Zabiego | G21C 7/10 |
| 2013/0288880 A1* | 10/2013 | Hinoki | G21B 1/13 501/88 |

FOREIGN PATENT DOCUMENTS

| | | | | |
|---|---|---|---|---|
| JP | 6 199578 | | 7/1994 | |
| JP | 11 116337 | | 4/1999 | |
| JP | H11133175 | * | 5/1999 | ............. G21C 7/10 |
| JP | 11 174186 | | 7/1999 | |
| JP | 2009 250884 | | 10/2009 | |
| JP | 2010 256094 | | 11/2010 | |
| JP | 2011-058865 | * | 3/2011 | ............. G21C 7/113 |
| JP | 2011-58865 | * | 3/2011 | ............. G21C 7/113 |
| JP | 2011 58865 | | 3/2011 | |
| JP | 2011 59086 | | 3/2011 | |
| JP | 4755121 | | 8/2011 | |
| WO | 2012 063923 | | 5/2012 | |

OTHER PUBLICATIONS

Maday, "Refractory Alloys, Ceramics and Composites Assessments for Generation IV Reactors", Deliverable No. D11.1, Seventh Framework Programme, Jan. 1, 2011.*
Katoh, "Advanced Radiation-Resistant Ceramic Composites", Advances in Science and Technology vol. 45 (2006) pp. 1915-1924.*
Yvon, "Structural materials challenges for advanced reactor systems", Journal of Nuclear Materials 385 (2009) 217-222.*
GIF Symposium, Paris (France), Sep. 9-10, 2009, pp. 77-91 and 113-120.*
International Search Report dated Dec. 10, 2013 in PCT/JP13/005676 Filed Sep. 25, 2013.
Decision to Grant a Patent dated May 23, 2017 in Japanese Patent Application No. 2014-538181 (with unedited computer generated English translation).

* cited by examiner

FIG. 6

|  | Density [g/cc] | Melting point [°C] |
|---|---|---|
| SiC | 3.2 | About 2700°C (pyrolysis temperature) |
| Stainless steel | 7.7~7.9 | About 1400°C |
| Zr | 6.5 | 1852°C |

(a)

(b)

NUCLEAR REACTOR CONTROL ROD WITH SIC FIBER REINFORCED STRUCTURE

TECHNICAL FIELD

Embodiments of the present invention relate to a reactor control rod for controlling a nuclear reactor and a method of manufacturing of it.

BACKGROUND ART

For example, in a boiling-water reactor (BWR), each control rod is placed in a gap between four fuel assemblies arranged in a square lattice, and is inserted or withdrawn. Accordingly, the control rod is formed to be a cross shape, and is shaped in such a way as to have wing portions in four directions. Each wing portion contains a neutron absorbing member.

The wing portion has, as a wing surface structure member, a sheath whose cross-section is deep U-shaped, and the sheath contains the neutron absorbing member therein. In a conventional control rod, a metal material, such as stainless steel, is used. Materials containing such elements having large neutron cross section as boron and hafnium (Hf) are used as neutron absorbing material.

For example, in some control rods using boron, boron carbide ($B_4C$) is used as a neutron absorbing material. A neutron absorption rod may be formed by encapsulating powder or pellets of $B_4C$ in an rod-shaped absorber made of stainless steel. The neutron absorption rod may be disposed in the sheath.

In some control rods using Hf, the sheath stores plates or flattened tubes made of Hf metal or an Hf alloy as neutron absorbing members therein.

The control rods are inserted or drawn via a lower portion of a reactor core by a control rod drive mechanism by means of hydraulic driving or electric driving. In an emergency, the control rod is inserted by the pressure of gas stored in an accumulator or the like.

The control rod drive mechanism of BWR is located below the control rod. Therefore, in order to secure the margin of driving power for insertion of the control rod drive mechanism, lightweight control rods are desirable.

Considering future trends such as increasing enrichment of fuel for high burnup of the fuels, worth of the control rods may be increased. Such measures of increasing the amount of Hf to achieve this causes increase of the weight of the control rods because of the high density of Hf, which is 13.3 $g/cm^2$. Therefore, such a control rods could not easily be applied to an existing reactor due to weight restrictions.

Some control rods use Hf stored in stainless steel sheaths. Then, corrosion advances between different metals, or between stainless steel and Hf, and the sliding friction between Hf and the stainless-steel sheath becomes higher due to corrosion products. Thus, stress is applied to the stainless-steel sheath due to a difference between expansion of Hf (irradiation growth or thermal expansion) and expansion of the stainless-steel sheaths, and some stainless-steel sheaths have been damaged.

In the case of BWR, fuel assemblies are surrounded by channel boxes made of a zirconium (Zr) alloy. However, there are reports of the shadow corrosion phenomenon, a phenomenon of significant corrosion on a surface facing a conventional stainless-steel sheath control rod (different metals).

When a critical event, such as loss of power, occurs due to a large-scale natural disaster, the insertion of control rods can shut a nuclear reactor. However, if the core cooling system fails to actuate, decay heat of fission products in the fuel or like may cause temperature rise of the nuclear reactor.

In the reactor internal structure of BWR, metallic materials have been mainly used, such as a Zr alloy for fuel rods and channel boxes and stainless steel for control rods. These metallic materials are oxidized by high-temperature steam through a metal-water reaction, to generate hydrogen gas. As the generation of hydrogen advances, the concentration of hydrogen inside a containment vessel increases. Under some conditions, the integrity of the containment vessel may be damaged by hydrogen combustion.

If the cooling of the nuclear reactor is not performed for an even longer time, the reactor core is further heated by decay heat, possibly resulting in an abnormally high temperature. The melting point of stainless steel, which is a structural material of the conventional control rods, is about 1,400 degrees Celsius. Meanwhile, fuel cladding tubes and the channel boxes are made of the Zr alloy; the melting point of Zr is about 1,850 degrees Celsius.

If the temperature of the reactor core continues rising, the controls rods could melt and fall down from the reactor core while the fuel assemblies do not melt. If such an event occurs and cooling water system becomes available, cooling water is injected into the reactor core without control rods inside. In this case, the water works as neutron moderator, and unintentionally might cause criticality of the reactor core.

Accordingly, the structural material keeping the structure of the control rods is desirable to be heat-resistant enough to maintain the shape at least during a period in which the fuel assemblies and channel boxes maintain their configurations.

As for the Hf control rods, in order to prevent the damage caused by thermal stress or an irradiation growth difference between different metals, or between the Hf neutron absorbing member and the stainless-steal sheath, as well as to prevent shadow corrosion by different-metal corrosion between the channel box and the stainless-steal sheath, structures in which Zr is used as the sheath of the control rod or a Hf—Zr alloy is used as a wing portion are proposed.

As an example using a high-temperature material for the control rods of the nuclear reactor, use of carbon/carbon composite (C/C composite) material and silicon carbide/silicon carbide composite (SiC/SiC composite) material is proposed for a control rods of a high-temperature gas reactor that is different from a control rod of the BWR.

The control rods in the boiling water reactor are constantly in contact with high-temperature water, that is different from the high-temperature gas reactor. Carbon fiber (C-fiber) or the like is oxidized by the water, resulting in a significant decrease in strength.

AS an example that the SiC is used as general structural material of the nuclear reactor, application of SiC material containing $^{11}B$ isotope that is stable under irradiation of neutron is proposed. In the case of application to the control rods of the light water reactor, $^{10}B$ which has a large neutron absorption cross section and causes an effect of increasing neutron absorption is preferred to be contained on some level to the extent without bad influence.

PRIOR ART DOCUMENT

Patent Document

Patent document 1: Japanese Patent Application Laid-Open Publication No. 2009-250884

Patent document 2: Japanese Patent Application Laid-Open Publication No. 2011-59086

Patent document 3: Japanese Patent Application Laid-Open Publication No. 2007-269621

SUMMARY OF THE INVENTION

Problems to be Solved by the Invention

If the neutron absorbing material, such as Hf, is increased in amount in order to enhance the reactivity worth of the control rod, the weight of the control rod increases, and the control rod therefore may not easily be applied to an existing reactor. In the case of the Hf control rod, the progress of corrosion between the control rod and the stainless-steel sheath may cause damage to the sheath.

If a critical event, such as loss of power, occurs due to a large-scale natural disaster or the like, and if the core cooling system fails to actuate, hydrogen may be generated through the metal-water reaction with the fuel cladding tube, the control rod structural material, and the like, and hydrogen combustion may damage the soundness of the containment vessel. If the cooling of the reactor core is not performed for an even longer time, the control rod, which is lower in melting point than the fuel assembly, may melt and fall down before the fuel assembly melts.

Embodiments of the present invention have been made to solve the above problems, and an object of embodiments of the present invention is to provide a lightweight reactor control rod capable of controlling the reactivity even in a higher temperature state than in a normal state.

Means for Solving the Problem

According to an embodiment, there is provided a reactor control rod for nuclear reactor comprising: a plurality of wing sections arranged radially around an axis extending in vertical direction in such a way as to be spaced out each other in a circumferential direction, each of the wing sections being a flat plate spreading in a direction of the axis and in a radial direction, each of the wing sections including a wing surface structural member and a neutron absorbing member contained in the wing surface structural member and containing a neutron absorbing material; and a central joint section bundling the plurality of wing sections together at center, wherein at least part of the central joint section and the wing surface structural member is made of SiC-fiber-reinforced SiC composite material.

According to another embodiment, there is provided a method of manufacturing a reactor control rod, the method comprising: a storage step of storing a neutron absorbing member including a neutron absorbing material into each of a plurality of storage tubes; an arrangement step of arranging the plurality of storage tubes into a shape of a flat plate and bundling the storage tubes together, after the storage step; and a wing element production step of forming a wing surface structural member through molding of SiC-fiber-reinforced SiC composite material in such a way as to cover surfaces of the plurality of storage tubes, after the arrangement step.

Advantage of the Invention

According to the embodiments of the present invention, a lightweight reactor control rod capable of controlling the reactivity even in a higher temperature state than in a normal state can be provided.

BRIEF DESCRIPTION OF THE DRAWINGS

FIG. 6 is a comparison table about characteristics of each material in order to explain effects of the reactor control rod according to the first embodiment;

FIG. 27 (a) shows step S1 of FIG. 26, and FIG. 27 (b) shows the state of steps S2 and S3 of FIG. 26.

DETAILED DESCRIPTION

Hereinafter, with reference to the accompanying drawings, embodiments of a reactor control rod and a method of manufacturing the reactor control rod of the present invention will be described. The same or similar portions are represented by the same reference symbols, and a duplicate description will be omitted.

First Embodiment

Figure 1:
FIG. 1 is a horizontal cross-sectional view of a reactor control rod and fuel assemblies located around the reactor control rod, according to a first embodiment.

FIG. 1 is a horizontal cross-sectional view of a reactor control rod and fuel assemblies located around the reactor control rod, according to a first embodiment. A reactor control rod 50 is disposed at the center of four fuel assemblies 100. Each of the fuel assemblies 100 includes: a plurality of fuel rods 102, which are arranged in a square lattice; and a channel box 101, which is formed into a square tube in such a way as to encircle the outer sides of the fuel rods 102.

The reactor control rod 50 includes rollers 8. The rollers 8 enable other part of the reactor control rod 50 to keep a distance from the outer wall surfaces of the adjacent four channel boxes 101, and ensure smooth insertion or drawing of the reactor control rod 50.

Figure 2:
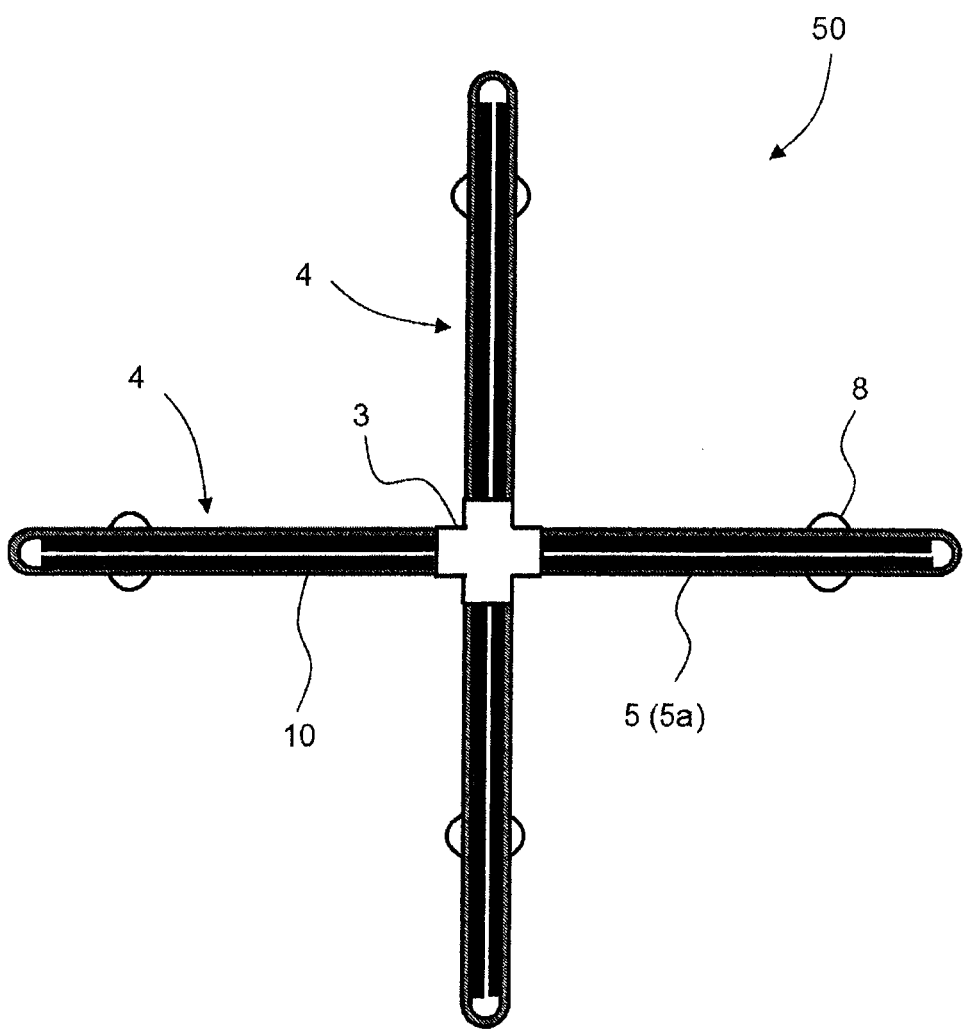
FIG. 2 is a horizontal cross-sectional view of the reactor control rod according to the first embodiment.

FIG. 2 is a horizontal cross-sectional view of the reactor control rod according to the first embodiment. The reactor control rod 50 includes a tie rod 3 extending in a longitudinal direction, and four wing sections 4 spreading around the tie rod 3 in such a way as to form an angle of 90 degrees with each other in a circumferential direction. The wing sections 4 each includes a neutron absorbing member 10 and a sheath 5 containing the neutron absorbing member 10 as a wing surface structural member 5a.

The sheath 5 has the outline of a flat plate. The sheath 5 extends parallel to the tie rod 3. One side of the sheath 5 is connected to the tie rod 3. Each Roller 8 arranged in each wing section 4 penetrates the sheath 5 and the neutron absorbing members 10, and protrudes from both sides of the wing section 4.

Figure 3:
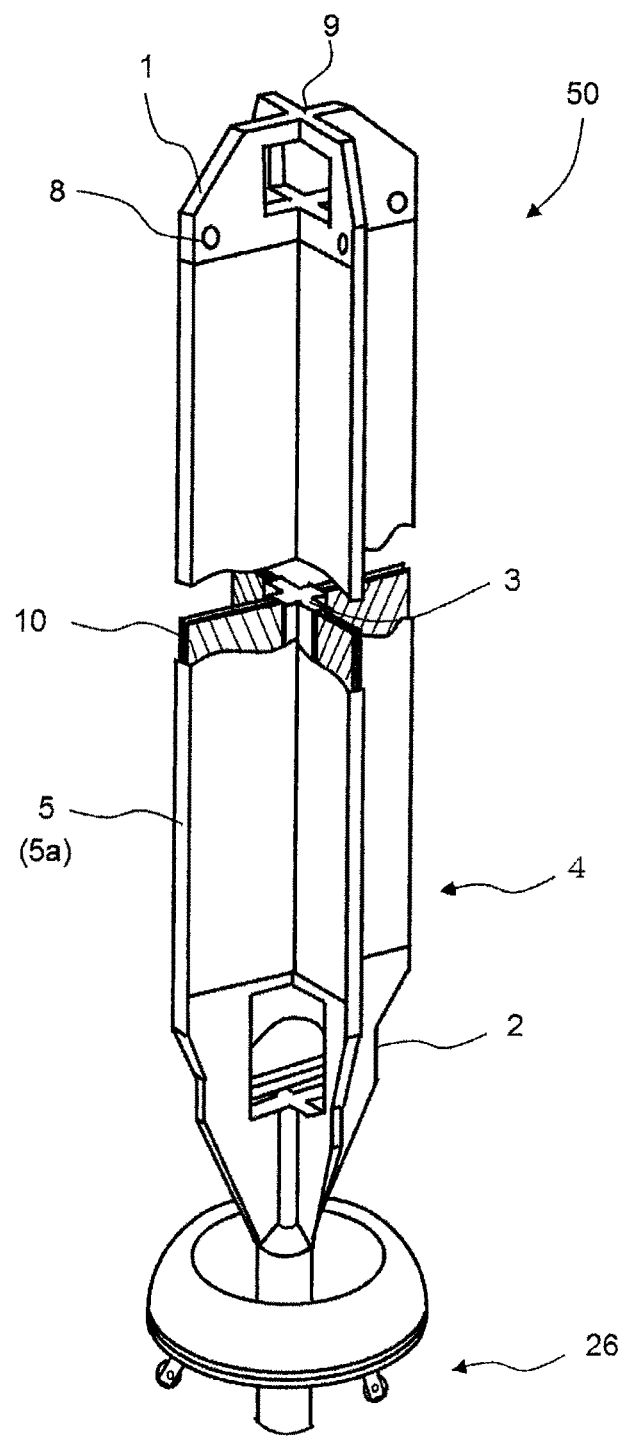
FIG. 3 is a perspective view of the reactor control rod of the first embodiment, with the reactor control rod being partially cut.

FIG. 3 is a perspective view of the reactor control rod of the first embodiment, with the reactor control rod being partially cut. In an upper portion of the reactor control rod, an upper end structural member 1 having a handle 9 is provided. In a lower portion of the reactor control rod, a lower end structural member 2 having a speed limiter 26 is provided. The upper end structural member 1 is connected to the lower end structural member 2 via tie rods 3.

In terms of horizontal cross-section, the upper end structural member 1 and the lower end structural member 2 are faulted into a cross shape like the sheath 5 with the tie rod 3 at the center thereof. That is, the upper end structural member 1 and the lower end structural member 2 form four wing sections 4. The rollers 8 are provided on the upper end structural member 1 in the wing sections 4.

In the sheath 5, a neutron absorbing member 10 is stored. The neutron absorbing member 10 may be a plate of hafnium, for example. In the sheath 5, a plurality of cooling holes may be formed in such a way as to allow reactor coolant to pass through the inside of the sheath 5.

Figure 4:
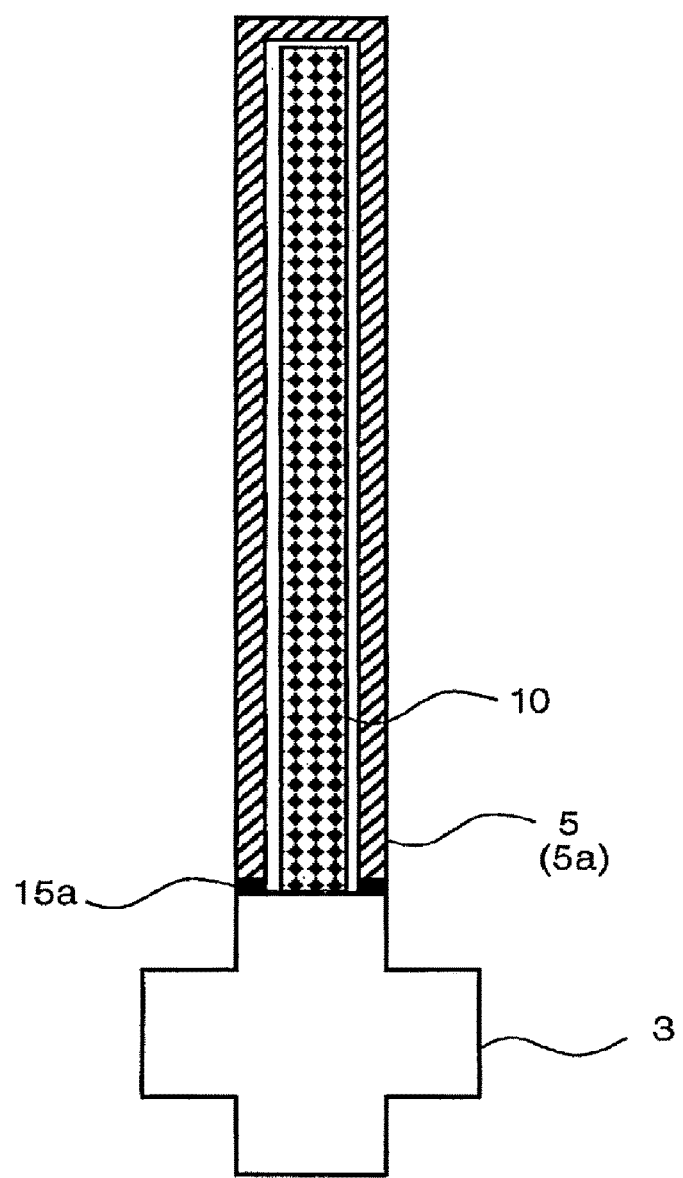
FIG. 4 is a horizontal cross-sectional view of a wing section of the reactor control rod according to the first embodiment.
Figure 5:
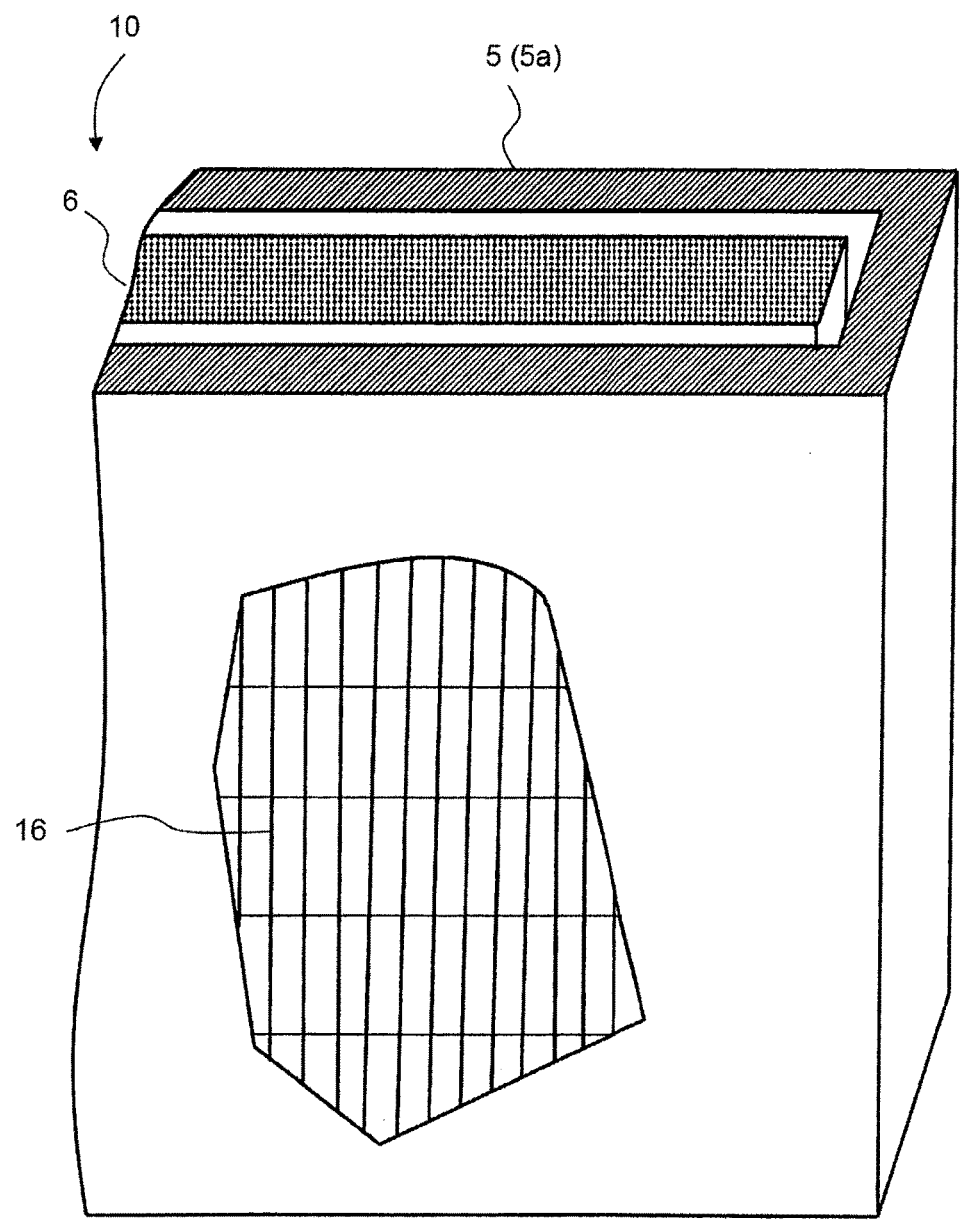
FIG. 5 is a partial perspective view of a wing section of the reactor control rod according to the first embodiment, with the wing section being partially cut.

FIG. 4 is a horizontal cross-sectional view of a wing section of the reactor control rod according to the first embodiment. FIG. 5 is a partial perspective view of a wing section of the reactor control rod according to the first embodiment, with the wing section being partially cut.

The sheath 5 is formed as the shape of a rectangular cross-section, and the neutron absorbing member 10 is stored inside the sheath 5. In the sheath 5, a SiC fiber-reinforced SiC composite material is used. As shown in FIG. 5, two directional fibers are combined into SiC fibers 16, the fibers of one group are oriented in the longitudinal direction of the tie rod 3 and the fibers of the other group are oriented in a direction perpendicular to the longitudinal direction. The number per unit volume of fibers oriented in the longitudinal direction of the tie rod 3 is greater than that of the other fibers.

In this case, the SiC fiber-reinforced SiC composite material (SiC/SiC composite material) is made by putting fibers of SiC material in a SiC-material matrix, and the strength thereof is enhanced by the combined effect of fibers of SiC material and SiC-material matrix.

Although not shown in the FIGs, the SiC/SiC composite material is also used as the material of the tie rod 3. A combination of two directional fibers are combined into a SiC fibers 16. The fibers of one group are oriented in the longitudinal direction of the tie rod 3 and the fibers of the other group are oriented in a direction perpendicular to the longitudinal direction. The number per unit volume of fibers oriented in the longitudinal direction of the tie rod 3 is greater than that of the other fibers.

As a method of manufacturing the SiC/SiC composite material by controlling the orientation of the SiC fibers 16, for example, the method includes forming sheets by plain weaving or any other weaving of SiC fibers with the fiber orientation under control and then forming a SiC matrix between SiC fibers in the sheets.

The method of forming the SiC matrix may be a Chemical Vapor Infiltration (CVI) method where source gas, such as trichloromethylsilane ($CH_3SiCl_3$), is heated and penetrate through the fibers to form the SiC matrix by the reaction of ($CH_3SiCl_3 \rightarrow SiC+3HCl\uparrow$).

The method may be a Polymer Impregnation and Pyrolysis (PIP) method where fibers are impregnated with raw polymer, such as polycarbosilane (e.g. $(-SiH(CH_3)CH_2-)_n$), and are burned to form the SiC matrix by the reaction of $((-SiH(CH_3)CH_2-)\rightarrow SiC+CH_4\uparrow+H_2\uparrow)$.

Alternatively, these methods maybe used together; or these methods may be used in combination with other matrix formation methods, such as a Melt Infiltration (MI) method.

In each combination of the tie rod 3 and the upper end structural member 1, the tie rod 3 and the lower end structural member 2, and the tie rod 3 and the sheaths 5 may be jointed together by brazing or diffusion bonding at a bonding section 15a, or may be jointed together with bolts and nuts.

The neutron absorbing member 10 may be an Hf plate 6 which is made of an Hf metal, for example. The neutron absorbing member 10 is fixed to the inner side of the sheath 5 with screw members and the like. The fixed portion may have looseness in order to absorb deformation of the neutron absorbing member 10 caused by irradiation growth, thermal expansion, or the like.

FIG. 6 is a comparison table about characteristics of each material in order to explain effects of the reactor control rod according to the first embodiment. The table compares the density and melting points of SiC, stainless steel, and Zr.

The density of stainless steel is 7.7 to 7.9 g/cc, and the density of Zr is 6.5 g/cc. The density of SiC is 3.2 g/cc, less than half the above figures. The melting point of stainless steel is about 1,400 degrees Celsius, and the melting point of Zr is 1,852 degrees Celsius. The melting point, or pyrolysis temperature, of SiC is about 2,700 degrees Celsius, far higher than the above figures. Therefore, a member made of SiC does not collapse before the fuel assemblies and structural members made of Zr or stainless steel melt.

SiC is chemically stable and highly unlikely to oxidize even in high-temperature steam. Therefore, the possibility of generating hydrogen as a result of a reaction with high-temperature steam is very low. Accordingly, the use of SiC/SiC composite material in the control rod, which is part of the reactor core internal structure, can reduce the amount of metal in the reactor core.

As a result, the amount of hydrogen generated can be reduced during the reactor core is abnormally heated. Reducing the amount of hydrogen generated can suppress the impact on the soundness of the containment vessel avoiding hydrogen combustion or hydrogen explosion.

SiC is one type of ceramics and a brittle material. However, the toughness of the member made of SiC can be enhanced by turning SiC into a fiber-reinforced material. As fiber-reinforced ceramics, other materials are also available, including C/C composite materials and C/SiC composite materials. However, these carbon fiber-reinforced composite materials can oxidizes in high-temperature water, possibly result in a significant decrease in the strength. In this manner, there are many problems to overcome to use these materials in the reactor core internal structure of a light-water reactor.

Moreover, SiC is a nonmetallic material and therefore can prevent corrosion even when different metals are in close proximity to each other. As a result, an increase in the sliding friction between the Hf plate 6 and the sheath caused by generation of corrosion products can be prevented, and to further improve the reliability of the structure of the control rod. Because of the nonmetallic material, it is possible to prevent shadow corrosion between a channel box made of Zr and a different metal.

Considering the chemical stability under the environment condition in the reactor, the use of the SiC/SiC composite material particularly offers greater benefits among fiber-reinforced ceramics.

According to the present embodiment, the use of the SiC/SiC composite material in the sheath 5 prevents generation of corrosion products. However, there is still a possibility that corrosion products are generated for some reason and may enter the sheath 5. In such a case, the Hf plate 6 and the sheath 5 are firmly stuck together, resulting in an increase in the sliding friction; and the Hf plate 6 and the sheath 5 therefore become unable to move in the axial direction. In this case, if irradiation growth occurs in the Hf plate 6, the outer-side sheath 5, too, is simultaneously being pulled.

Therefore, the reactor control rod 50 is required to be higher in strength in the axial direction of the reactor control rod 50 than in the horizontal direction. As for the SiC/SiC composite material that is used in the sheath 5 and the tie rod 3, the number of SiC fibers 16 in the longitudinal direction of the tie rod 3 is larger, thereby ensuring that the reactor control rod 50 is higher in strength in the axial direction of the reactor control rod 50.

According to the embodiment of the present invention, major components, such as the tie rod 3 and the sheaths 5, employ the SiC/SiC composite material. Therefore, it is possible to reduce the weight and achieve not only high melting points but also a higher level of structural strength. Accordingly, it is possible to provide a reactor control rod that can control the reactivity of fuel assemblies even in a high-temperature state that exceeds a normal state.

Figure 7:
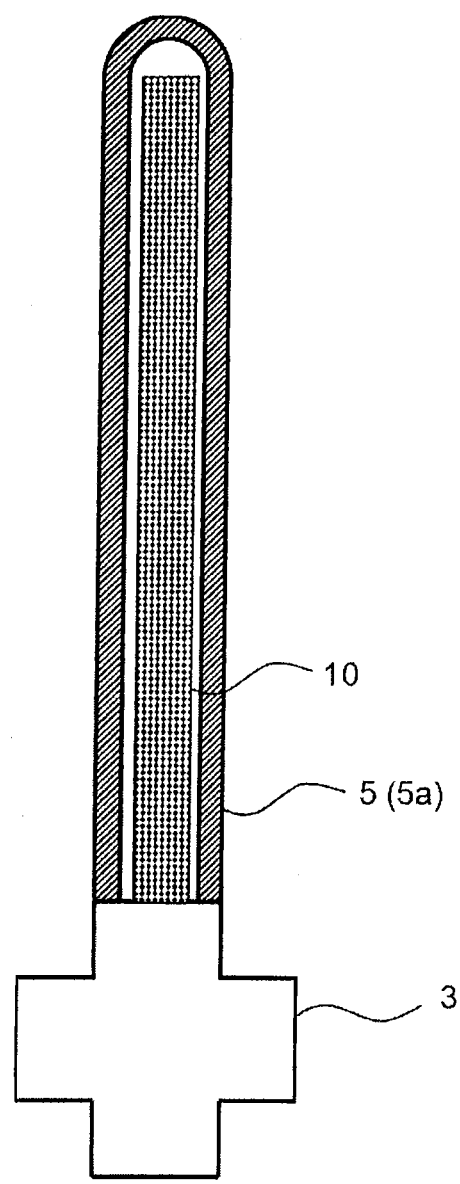
FIG. 7 is a horizontal cross-sectional view of a first modified example of a wing section of a reactor control rod according to the first embodiment.

In the first embodiment, the sheath 5 is U-shaped in horizontal cross-section. However, the shape of the sheath is not limited to this. FIG. 7 is a horizontal cross-sectional view of a first modified example of a wing section of a reactor control rod according to the first embodiment. As shown in the FIG. 7, the sheath 5 may be formed into a deeply bent U-shape in cross-section by direct burning or the like.

Figure 8:
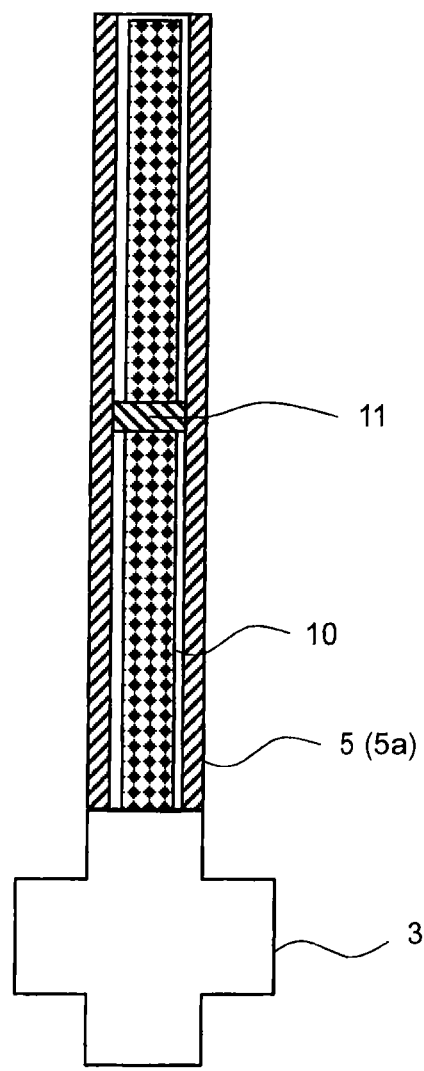
FIG. 8 is a horizontal cross-sectional view of a second modified example of a wing section of a reactor control rod according to the first embodiment.

FIG. 8 is a horizontal cross-sectional view of a second modified example of a wing section of a reactor control rod according to the first embodiment. As shown in FIG. 8, a horizontal-direction end of the control rod may be opened. Two sheaths 5 on both sides of the wing may be reinforced by a connecting body 11 if necessary. In this case, the connecting body 11 that connects the sheaths 5 is desirably made of the SiC/SiC composite material as in the case of the sheaths 5. Moreover, a neutron absorbing member 10 may have a gap inside the sheaths 5; cooling holes may be formed in the sheaths 5 in order to allow reactor water to pass through the gap.

Figure 9:
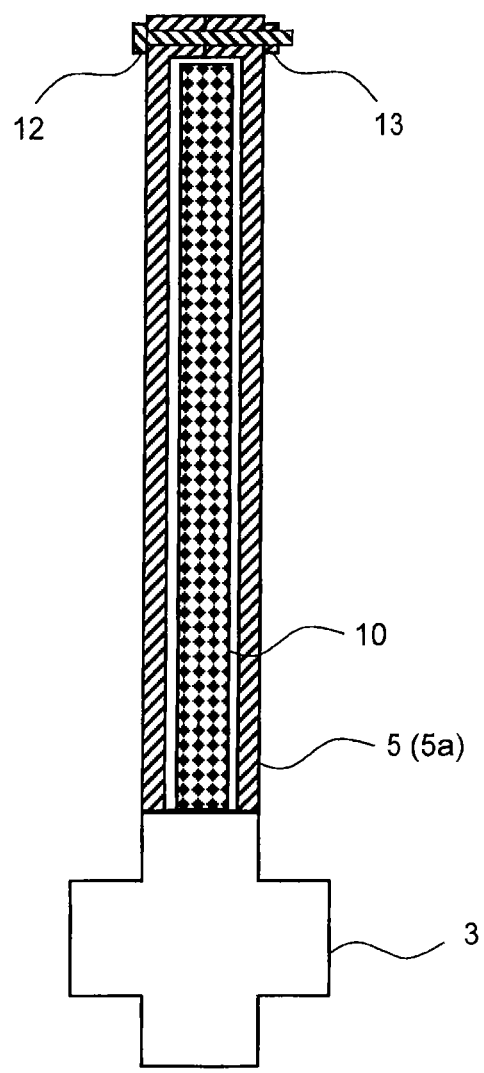
FIG. 9 is a horizontal cross-sectional view of a third modified example of a wing section of a reactor control rod according to the first embodiment.

FIG. 9 is a horizontal cross-sectional view of a third modified example of a wing section of a reactor control rod according to the first embodiment. Each surface plate of the wing is made of the SiC/SiC composite material. The two plates are joined together to form a deep U-shape, or the end portions of the two plates are joined together via a narrow-width plate, to form the sheath 5. The two plates made of the SiC/SiC composite material may be joined with bolts 12 and nuts 13, as shown in FIG. 9. Since the bolts 12, the nuts 13, and the like are used to keep the structure of the control rod, it is desirable that the bolts 12, the nuts 13, and the like be made of the SiC/SiC composite material.

Figure 10:
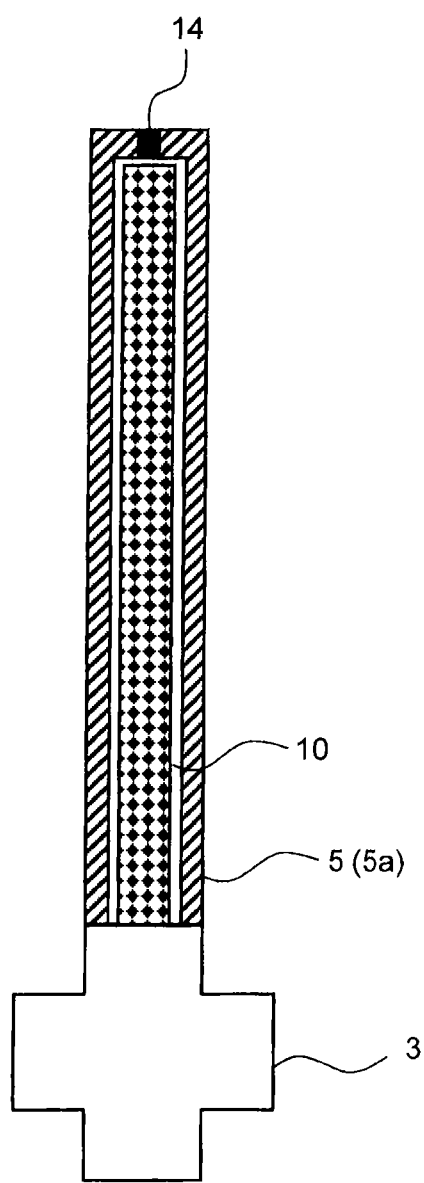
FIG. 10 is a horizontal cross-sectional view of a fourth modified example of a wing section of a reactor control rod according to the first embodiment.

FIG. 10 is a horizontal cross-sectional view of a fourth modified example of a wing section of a reactor control rod according to the first embodiment. The components may be joined together by providing a brazing section 14, which is made of an alloy brazing material containing titanium (Ti) and the like.

Figure 11:
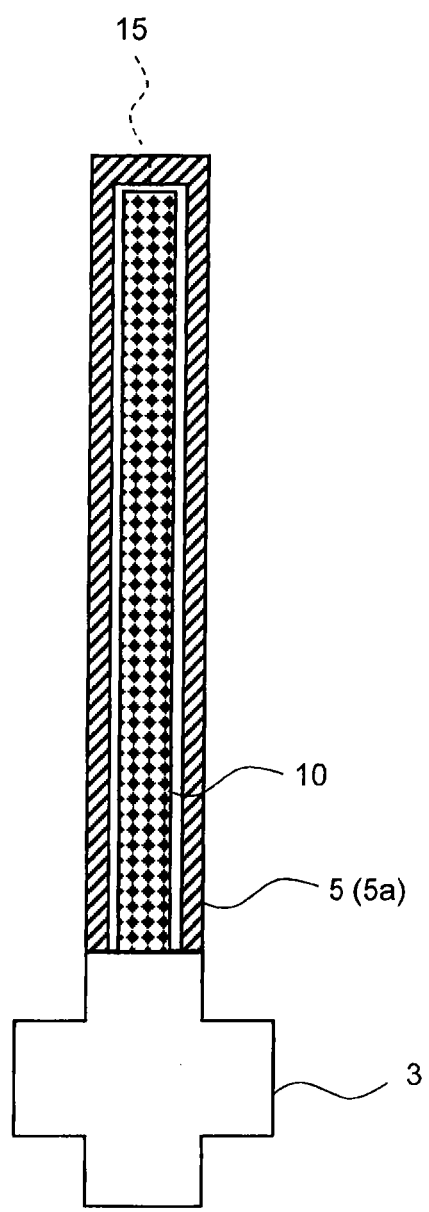
FIG. 11 is a horizontal cross-sectional view of a fifth modified example of a wing section of a reactor control rod according to the first embodiment.

FIG. 11 is a horizontal cross-sectional view of a fifth modified example of a wing section of a reactor control rod according to the first embodiment. As shown in FIG. 11, solid-phase bonding with a diffusion bonding section 15 may be employed.

Second Embodiment

Figure 12:
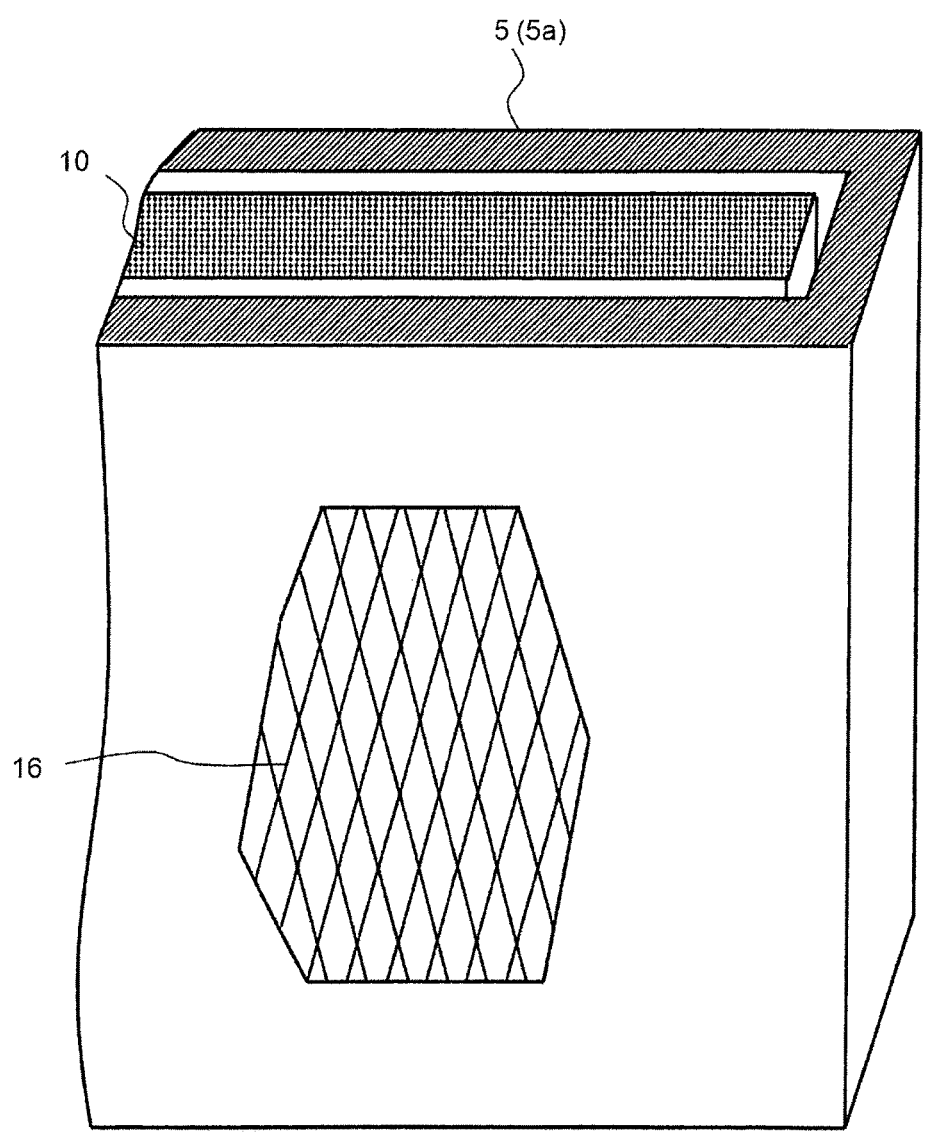
FIG. 12 is a partial perspective view of a wing section of a reactor control rod according to a second embodiment, with the wing section being partially cut.

FIG. 12 is a partial perspective view of a wing section of a reactor control rod according to a second embodiment, with the wing section being partially cut. SiC/SiC composite material used in a sheath 5 of the present embodiment have SiC fibers 16 combined with each other which are oriented in two directions, that are inclined with respect to the vertical direction, in which a tie rod 3 extends.

Figure 13:
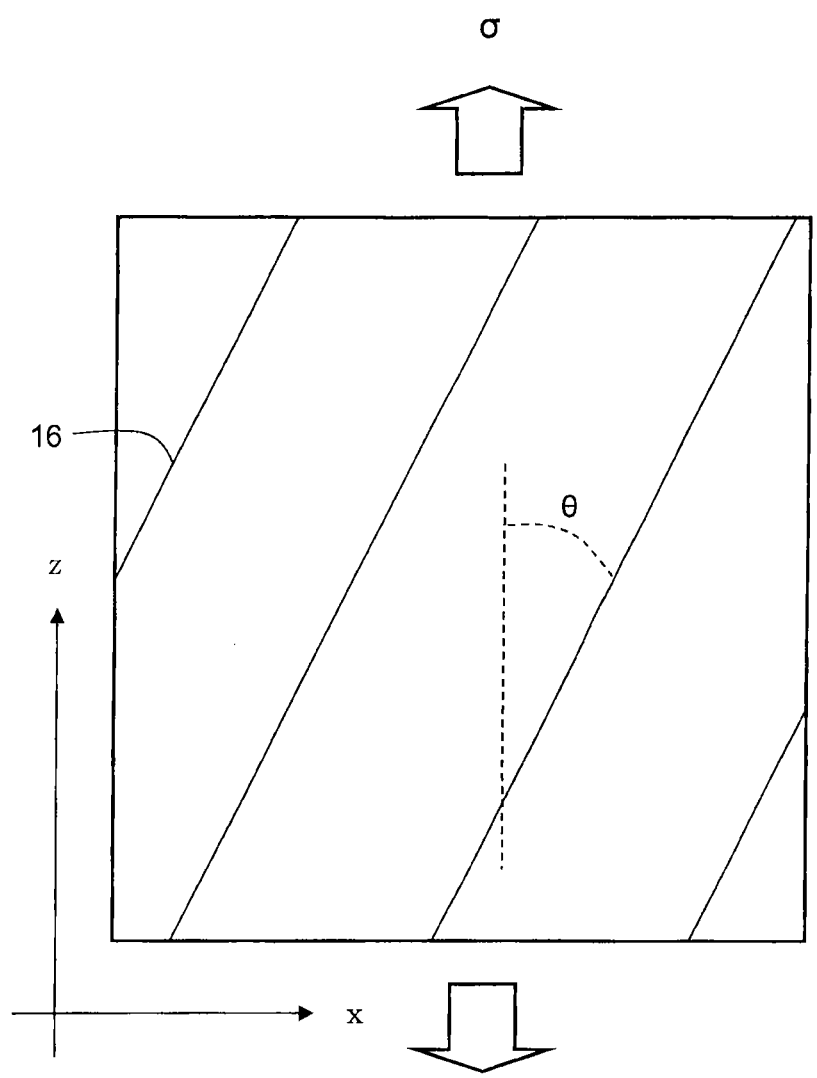
FIG. 13 is a conceptual diagram for explaining effects of the directions of SiC fibers of the reactor control rod according to the second embodiment.

FIG. 13 is a conceptual diagram for explaining effects of the directions of SiC fibers of the reactor control rod according to the second embodiment. If tensile stress σ is being applied in a direction that forms an angle of θ with the direction of the SiC fibers 16, the stress applied to the composite material can be divided into parallel and vertical components with respect to the SiC fibers 16, as described below.

$$\begin{pmatrix} \cos\theta & -\sin\theta \\ \sin\theta & \cos\theta \end{pmatrix} \begin{pmatrix} \sigma & 0 \\ 0 & 0 \end{pmatrix} \begin{pmatrix} \cos\theta & \sin\theta \\ -\sin\theta & \cos\theta \end{pmatrix} = \begin{pmatrix} \sigma\cdot\cos^2\theta & \sigma\cdot\sin\theta\cdot\cos\theta \\ \sigma\cdot\sin\theta\cdot\cos\theta & \sigma\cdot\sin^2\theta \end{pmatrix}$$

The element of the first row and first column of the right-hand side represents the stress being applied in the direction of the SiC fibers 16. The element of the second row and second column of the right-hand side represents the stress being applied in a direction perpendicular to the direction of the SiC fibers 16. The element of the first row and second column of the right-hand side, and the element of the second row and first column of the right-hand side represent shear stress.

If the weakest component of all kinds of stress listed above leads to destruction, the weakest component is the strength of a component perpendicular to the SiC fibers 16, and this component is likely to lead to destruction. That is, if tensile strength in the direction perpendicular to the SiC fibers 16 is represented by Fr, the condition for destruction can be represented as: $\sigma \sin^2\theta > Fr$ or $\sigma > Fr/\sin^2\theta$. Accordingly, if tensile stress a is being applied in a direction (z-direction in FIG. 13) that forms an angle of θ with the direction of the SiC fibers 16, the tensile strength is approximately expressed as $Fr/\sin^2\theta$. Similarly, the tensile strength in a direction (x-direction in FIG. 13) perpendicular to load is expressed as $Fr/\cos^2\theta$.

Therefore, in order to make the load-direction strength greater than or equal to the load-perpendicular-direction strength, the fibers may be oriented in such a way that satisfies the condition of $Fr/\sin^2\theta \geq Fr/\cos^2\theta$ leading to $1 \geq \tan^2\theta$, or that $\cos^2\theta \geq \frac{1}{2}$. If the orientation directions of fibers include other directions than one direction, arithmetic mean value of these fibers may be used to evaluate approximately.

That is, if condition of $\cos^2\theta \geq \frac{1}{2}$ is satisfied, the stress in the direction of the SiC fibers 16 is greater than the stress in the direction perpendicular to the direction of the SiC fibers 16. Accordingly, if each of the SiC fibers 16 is oriented in such a way as to make an angle of θ with the main stress direction, the strength is ensured by adjusting the orientation directions of the SiC fibers in such a way that the average of $\cos^2\theta$ of all SiC fibers 16 is greater than or equal to $\frac{1}{2}$.

Third Embodiment

Figure 14:
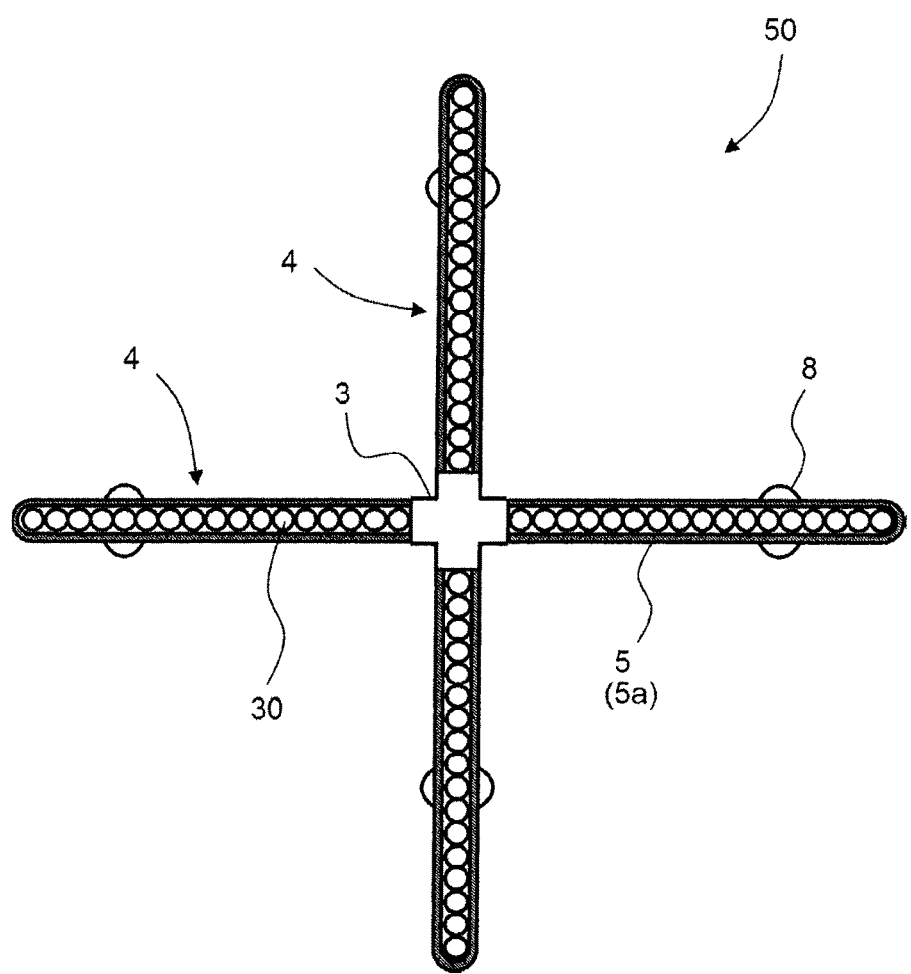
FIG. 14 is a horizontal cross-sectional view of a reactor control rod and fuel assemblies located around the reactor control rod, according to a third embodiment.

FIG. 14 is a horizontal cross-sectional view of a reactor control rod and fuel assemblies located around the reactor control rod, according to a third embodiment. In a sheath 5, a plurality of rod-shaped absorbers 30 extending parallel to the longitudinal direction of a tie rod 2 are arranged from the center side of a wing section 4 toward the outer side.

Figure 15:
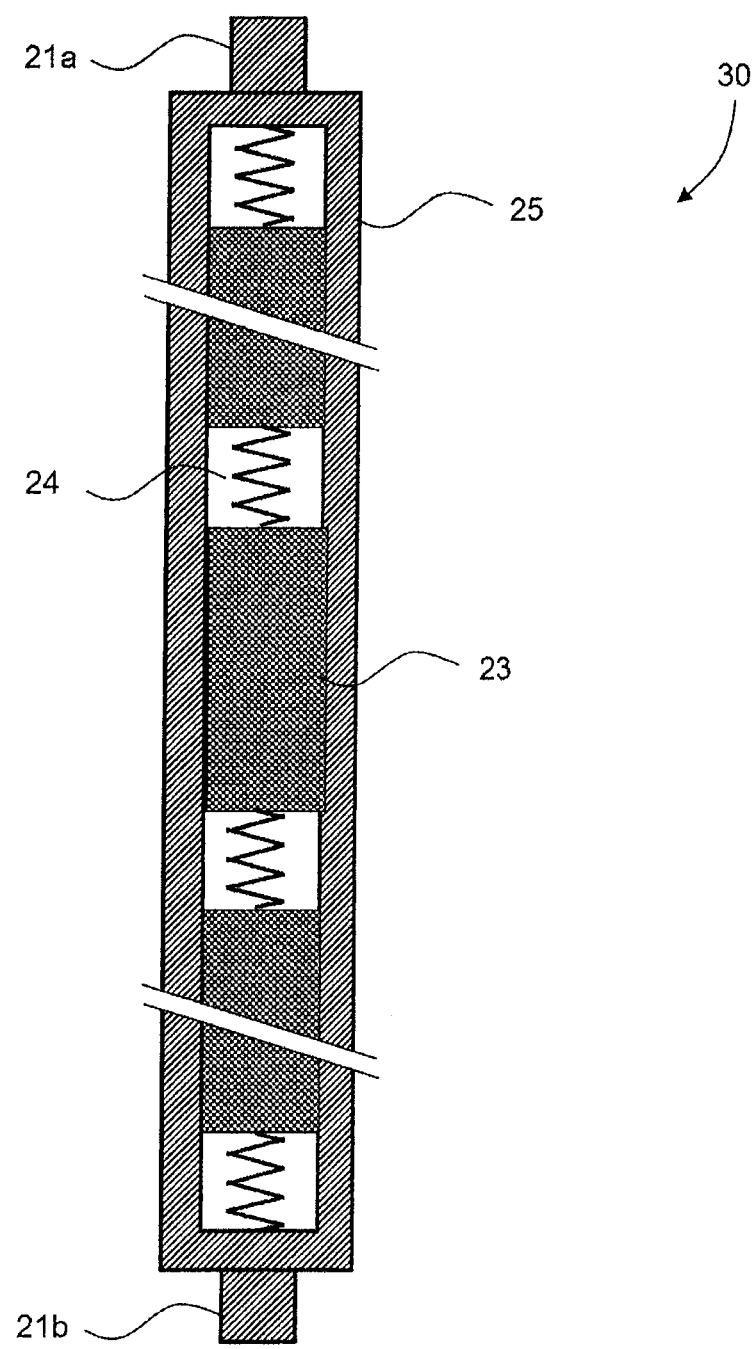
FIG. 15 is a sectional elevational view of an rod-shaped absorber of the reactor control rod according to the third embodiment.

FIG. 15 is a sectional elevational view of an rod-shaped absorber of the reactor control rod according to the third embodiment. The rod-shaped absorber 30 includes: a cladding tube 25 extending in a cylindrical shape; an upper end plug 21a sealing an upper portion of the cladding tube 25; a lower end plug 21b sealing a lower portion of the cladding tube 25; a plurality of $B_4C$ pellets 23 disposed in an enclosed space configured by the cladding tube 25; upper end plug 21a and lower end plug 21b; and springs 24 disposed in the enclosed space in such a way as to be adjacent to the upper and lower sides of $B_4C$ pellets 23 and pushing each $B_4C$ pellet 23 in the vertical direction.

FIG. 15 shows an example in which the $B_4C$ pellets 23 and the springs 24 are alternately disposed. However, the configuration is not limited to the alternately-arranged one, as long as it is possible to prevent unintentional movement of the $B_4C$ pellets 23 in the cladding tube 25. For example, a spring 24 may be disposed for each set of several $B_4C$ pellets 23, with the spring 24 pushing the $B_4C$ pellets 23 in the vertical direction.

Figure 16:
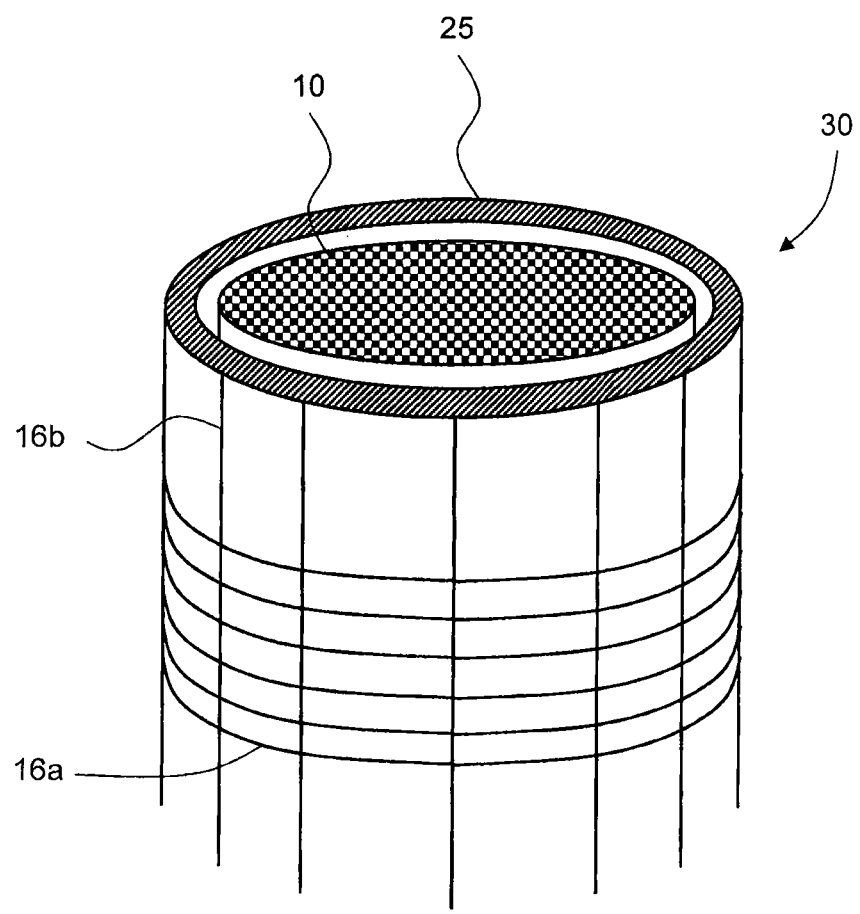
FIG. 16 is a perspective view of an rod-shaped absorber of the reactor control rod according to the third embodiment, with the rod-shaped absorber being partially cut.

FIG. 16 is a perspective view of an rod-shaped absorber of the reactor control rod according to the third embodiment, with the rod-shaped absorber being partially cut.

$B_4C$ absorbs neutrons through reaction $^{10}B(n, \alpha)$. The absorption of neutrons generates He. As the absorption of neutrons advances, the internal pressure of the cladding tube 25, which contains $B_4C$, increases due to He gas inside the cladding tube 25, putting a load on the cladding tube 25 due to the internal gas pressure. If internal pressure is applied to a cylindrical structure, stress is increased in the circumferential direction. Therefore, the cladding tube 25 is required to be higher in strength in the circumferential direction.

The cladding tube 25 of the rod-shaped absorber 30 uses the SiC/SiC composite material. The SiC fibers include SiC fibers 16a extending in a direction perpendicular to the longitudinal direction, i.e. circumferential direction of the cladding tube 25, and SiC fibers 16b extending in a direction parallel to the longitudinal direction of the cladding tube 25. The number per unit volume of SiC fibers 16a extending in the direction perpendicular to the longitudinal direction of the cladding tube 25 is equal to or more than that of SiC fibers 16b.

In this case, if an angle between the SiC fibers of the SiC/SiC composite material used in the cladding tube 25 and the circumferential direction of the cladding tube 25 is represented by φ, the arithmetic mean of $\cos^2\varphi$ of all SiC fibers with respect to each of the SiC fibers 16a and 16b is greater than or equal to $\frac{1}{2}$.

According to the present embodiment, the cladding tube 25 employs the SiC/SiC composite material. Therefore, it is possible to reduce the weight and ensure a higher level of structural strength as well as higher melting point. As a result, it is possible to prevent the loss of the neutron absorbing member 10 by avoiding the melting of the cladding tube 25 even in a high-temperature state that exceeds a normal state. Moreover, since the conventional stainless steel is replaced with the SiC/SiC composite material, the weight of the reactor control rod 50 can be reduced, to improve the performance of insertion into the reactor core.

Fourth Embodiment

Figure 17:
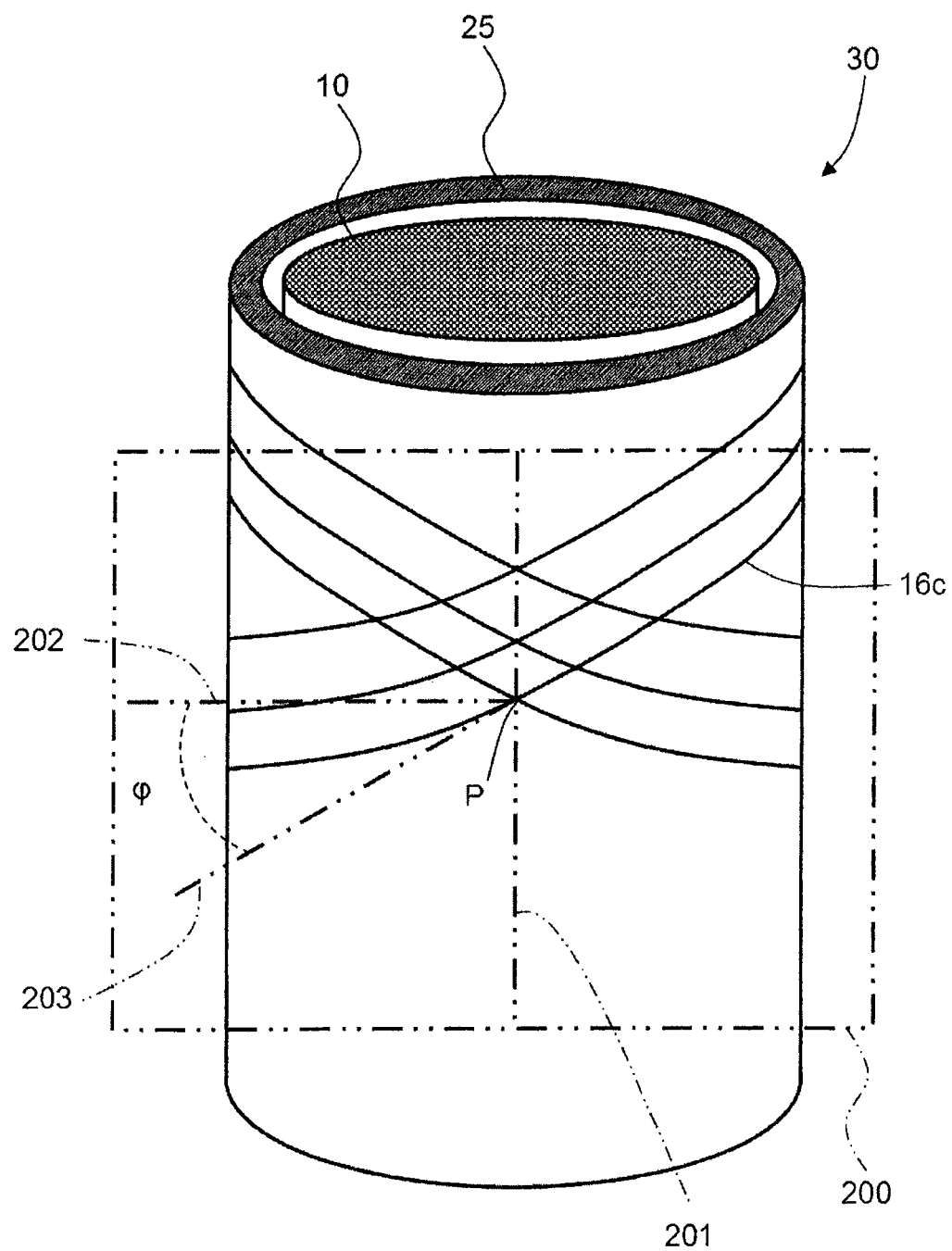
FIG. 17 is a perspective view of an rod-shaped absorber of a reactor control rod according to a fourth embodiment, with the rod-shaped absorber being partially cut.

FIG. 17 is a perspective view of an rod-shaped absorber of a reactor control rod according to a fourth embodiment, with the rod-shaped absorber being partially cut. The present embodiment is a variant of the third embodiment. The direction of SiC fibers of SiC/SiC composite member used in a cladding tube 25 of an rod-shaped absorber 30 is changed.

According to the present embodiment, SiC/SiC composite material having SiC fibers 16c is used, wound in a spiral in a direction diagonal to the axial direction of the rod-shaped absorber 30. The spiral SiC fibers 16c each extending in different directions are so formed as to cross each other.

If an angle between each SiC fiber 16c of the SiC/SiC composite material and the circumferential direction of the cladding tube 25 is represented by $\varphi$, the directions of the SiC fibers 16c are set in such a way that the arithmetic mean of $\cos^2\varphi$ for all the SiC fibers 16c is greater than or equal to ½. Each angle $\varphi$ that each SiC fiber 16c forms with the circumferential direction of the cladding tube 25 can be defined as an angle that a straight line 202 makes with a tangent 203 to a SiC fiber 16c at position P in a plane 200. The plane 200 is in contact with the outer side of the cladding tube 25 at position P as shown in FIG. 17. The straight line 202 and a straight line 201 cross at right angle at the point P. The straight line 201 is the projected line of the central axis of the rod-shaped absorber 30 on the plane 200.

FIG. 17 shows the directions of the SiC fibers 16c in such a way that a right-handed winding and a left-handed winding are symmetrical. However, the directions need not be symmetrical each other as long as the mean of $\cos^2\varphi_i$ of all the SiC fibers 16c is greater than or equal to ½, with $\varphi_i$ representing each angle.

As described above, in the case of the present embodiment, it is possible to reduce the weight. Moreover, it is possible to prevent the loss of the neutron absorbing member 10 by avoiding the melting of the cladding tube 25 even in a high-temperature state that exceeds a normal state. Furthermore, since the conventional stainless steel is replaced with the SiC/SiC composite material, the weight of the reactor control rod 50 can be reduced, resulting in an improvement in the performance of insertion into the reactor core.

Fifth Embodiment

Figure 18:
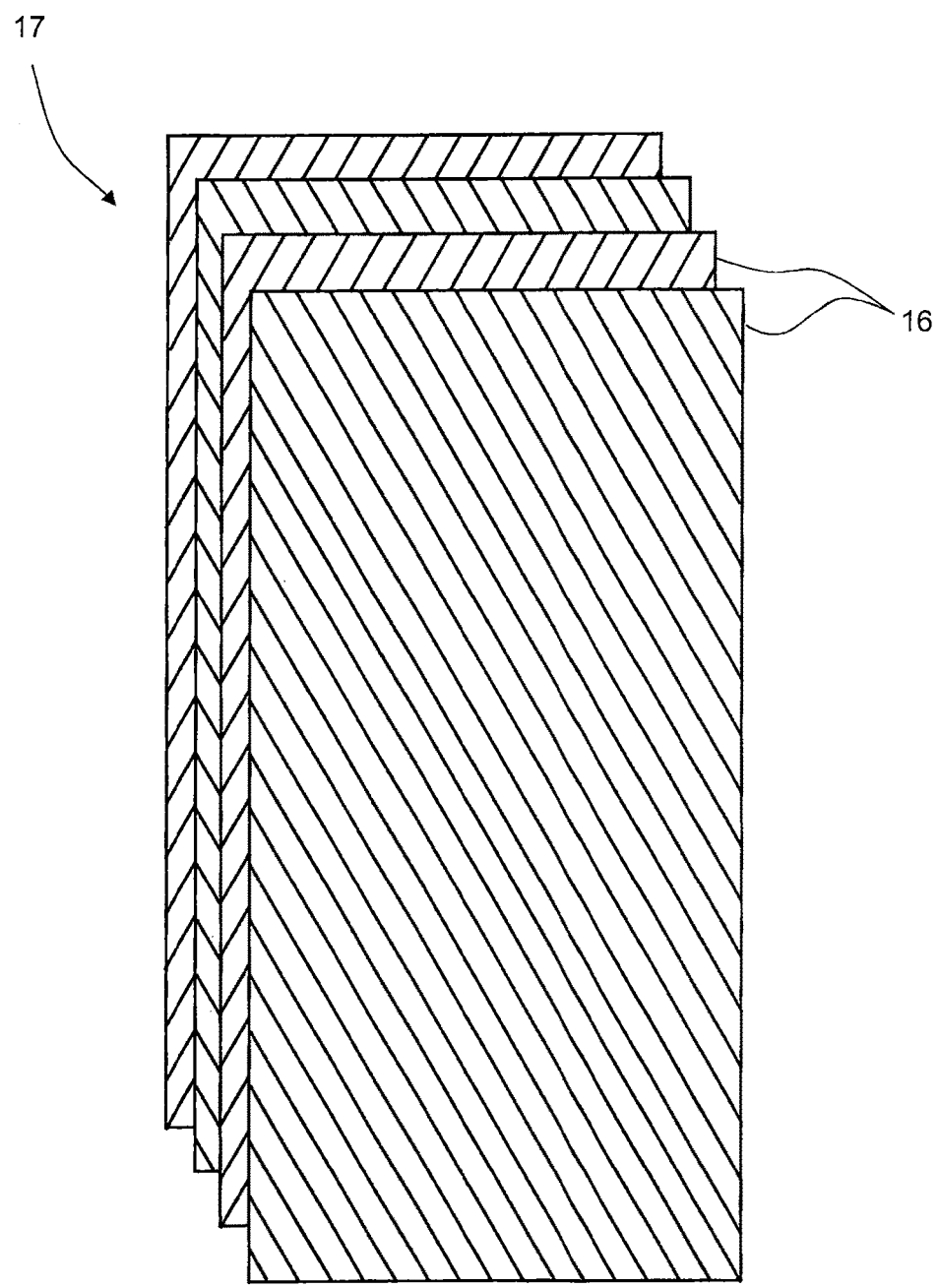
FIG. 18 is a conceptual diagram showing SiC fiber sheets used in an rod-shaped absorber of a reactor control rod according to a fifth embodiment.

FIG. 18 is a conceptual diagram showing SiC fiber sheets used in an rod-shaped absorber of a reactor control rod according to a fifth embodiment.

In the case of the present embodiment, SiC/SiC composite material sheets 17 made as sheets of the SiC/SiC composite material are used. In one sheet, SiC fibers 16 are formed in a diagonal direction. On the back side of the sheet, the SiC fibers 16 are formed in an opposite diagonal direction. When two sheets are put together, one set of sheets is obtained in which the SiC fibers 16 cross each other.

For example, one set of the sheets attached to a sheath 5 of a wing section 4 or to a cladding tube 25 of an rod-shaped absorber 30 enables each strength to increase. Alternatively, a large number of these sheets may be put together to form the sheath 5 or the cladding tube 25.

The direction of the SiC fibers 16 in the SiC/SiC composite material sheet 17 may have an angle of 45 degrees or more with respect to the longitudinal direction. In this case, if the strength is to be secured in the longitudinal direction of the SiC/SiC composite material sheet 17, the direction of the SiC fibers 16 should be set in such away that the arithmetic mean of $\cos^2\varphi$ for all the SiC fibers 16 is greater than or equal to ½.

As described above, when the strength of the sheath 5 or cladding tube 25 is to be secured or improved by the sheets of the present embodiment, it is possible to secure the same functions through easy handling.

Sixth Embodiment

Figure 19:
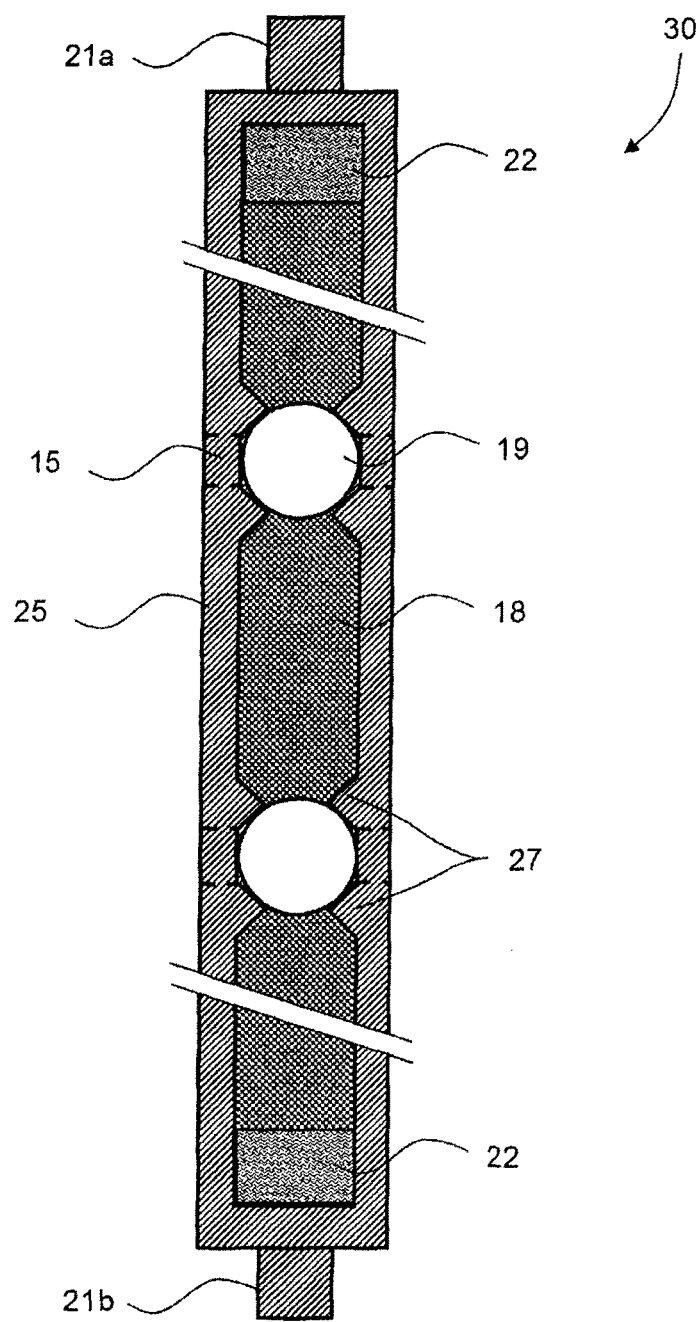
FIG. 19 is a sectional elevational view of an rod-shaped absorber of a reactor control rod according to a sixth embodiment.

FIG. 19 is a sectional elevational view of an rod-shaped absorber of a reactor control rod according to a sixth embodiment. The present embodiment is a variant of the third or fourth embodiment. Inside an cladding tube 25, $B_4C$ powder 18 is put into an area sandwiched between upper-end iron wool 22 and lower-end iron wool 22. Metal balls 19 are disposed in each location along the axial direction in order to restrict the movement of $B_4C$ powder 18.

In order to prevent the movement of the metal balls 19, ball stoppers 27 are provide in the cladding tube 25. The positions of the metal balls 19 are fixed at the ball stoppers 27. This structure can be made by preparing a plurality of tubes made of the SiC/SiC composite material, encapsulating the $B_4C$ powder 18 and the metal balls 19, and then joining the components together. Brazing or diffusion bonding may be employed as the joining method.

As described above, according to the present embodiment, it is possible to reduce the weight. Moreover, it is possible to prevent the loss of the neutron absorbing member 10 by avoiding the melting of the cladding tube 25 even in a high-temperature state that exceeds a normal state. Furthermore, since the conventional stainless steel is replaced with the SiC/SiC composite material, the weight of the reactor control rod 50 can be reduced, resulting in an improvement in the performance of insertion into the reactor core.

Seventh Embodiment

Figure 20:
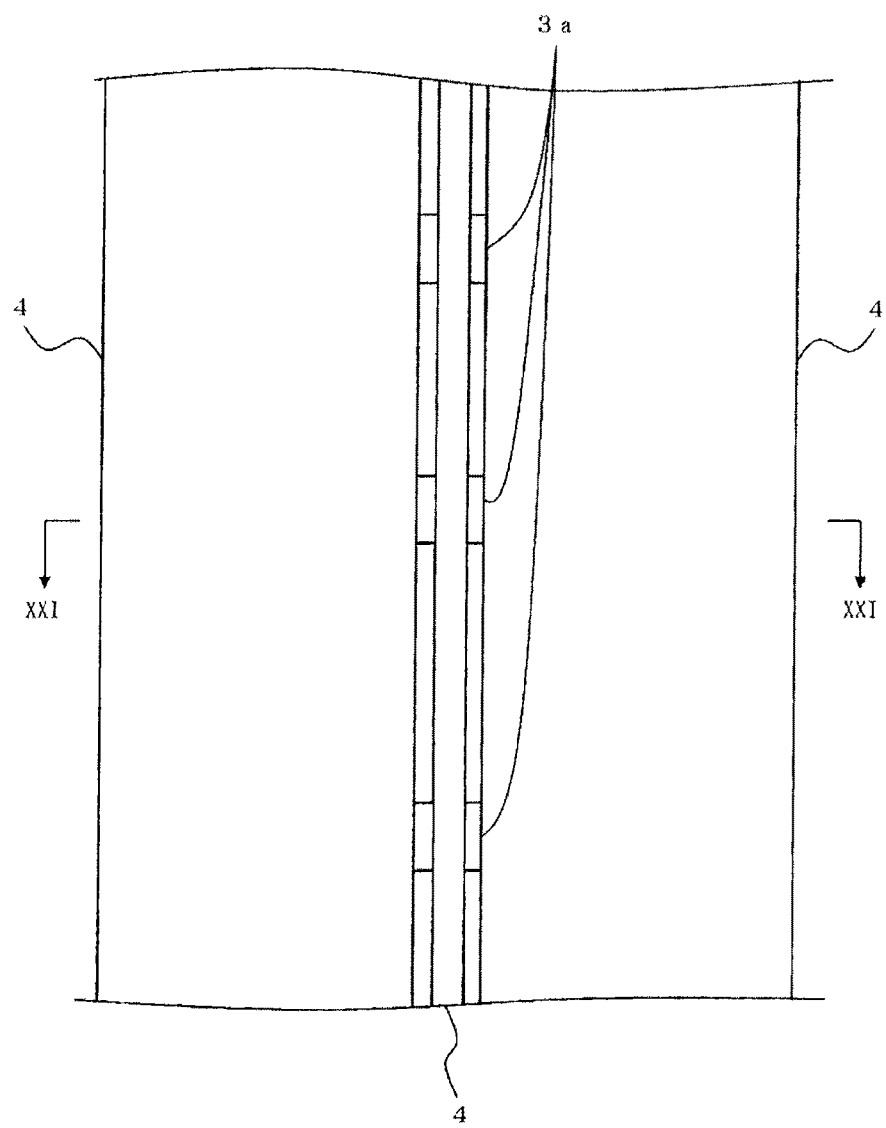
FIG. 20 is a partial front view of a reactor control rod according to a seventh embodiment.
Figure 21:
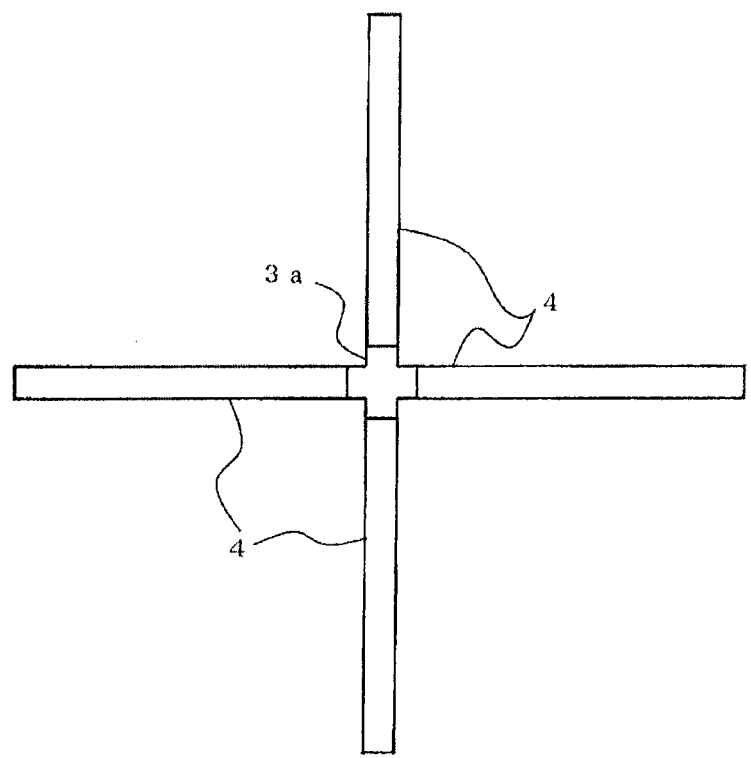
FIG. 21 is a cross-sectional plan view of the reactor control rod of the seventh embodiment of FIG. 20 taken along allow line XXI-XXI.

FIG. 20 is a partial front view of a reactor control rod according to a seventh embodiment. FIG. 21 is a cross-sectional plan view of the reactor control rod of the seventh embodiment of FIG. 20 taken along arrow line XXI-XXI.

The present embodiment is a variant of one of the first to sixth embodiments. As described in the description of the first embodiment, four wing sections 4 are connected to a tie rod 3 at the center. The tie rod extends seamlessly in the vertical direction. On the other hand, in the case of the present embodiment, the tie rod 3 is replaced with a tie cross 3a which extends in the vertical direction, not seamlessly but separately.

As shown in FIGS. 20 and 21, four wing sections 4 are each connected at one side which extends in the vertical direction. In a central portion, a plurality of tie crosses 3a are provided in such a way as to be spaced out in the vertical direction. The four wing sections 4 are connected via the tie crosses 3a arranged at intervals.

As described above, even in the case of the present embodiment formed, similarly, it is possible to reduce the weight. Moreover, it is possible to prevent the loss of the neutron absorbing member 10 by avoiding the melting of the cladding tube 25 even in a high-temperature state that exceeds a normal state. Furthermore, since the conventional stainless steel is replaced with the SiC/SiC composite material, the weight of the reactor control rod 50 can be reduced, resulting in an improvement in the performance of insertion into the reactor core.

Eighth Embodiment

Figure 22:
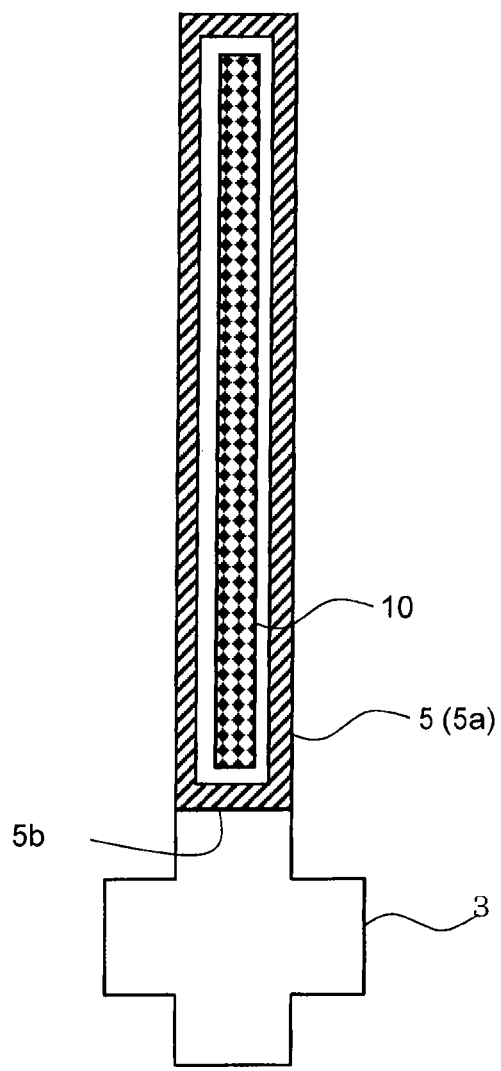
FIG. 22 is a horizontal cross-sectional view of a wing section of a reactor control rod according to an eighth embodiment.

FIG. 22 is a horizontal cross-sectional view of a wing section of a reactor control rod according to an eighth embodiment. The present embodiment is a variant of the first embodiment. The sheath 5 of the wing section 4 (FIG. 2) of the first embodiment surrounds the periphery of the neutron absorbing member 10 when being joined to the tie rod 3. However, in the case of the sheath 5 alone, the side of the sheath 5 that is to be joined to the tie rod 3 is opened.

Meanwhile, a sheath 5 of this eighth embodiment made of the SiC/SiC composite material has the side part joined to the tie rod 3 that is sealed with a sealing section 5b, and is made of the SiC/SiC composite material. That is, in the case of the sheath 5 of this eighth embodiment, the neutron absorbing member 10 is independently encapsulated by the sheath 5, which includes the sealing section 5b made of the SiC/SiC composite material.

According to the present embodiment, with the above configuration, even if the tie rod 3 made of other than the SiC/SiC composite material is melted in a high-temperature state that exceeds a normal state, it is possible to prevent the loss of the neutron absorbing member 10.

Alternatively, even if the tie rod 3 is made of the SiC/SiC composite material, and if the joining of the sheath 5 to the tie rod 3 is broken due to mechanical loading or the like, the neutron absorbing member 10 continues to be encapsulated by the sheath 5 alone, which is made of the SiC/SiC composite material. Therefore, it is possible to prevent the loss of the neutron absorbing member 10.

Alternatively, the tie rod 3 and the sheath 5 may be formed integrally with the use of the SiC/SiC composite material, and the tie rod 3 itself may be used as a sealing member for the neutron absorbing member, which is encapsulated in the sheath 5. In this case, since the tie rod 3 and the sheath 5 are formed integrally with the SiC/SiC composite material, it is possible to prevent the melting of the tie rod 3 even in a high-temperature state that exceeds a normal state. Moreover, it is possible to reduce the possibility that the joining of the sheath 5 to the tie rod 3 would be broken due to mechanical loading or the like.

In the present embodiment, the neutron absorbing member that is contained or enclosed in the sheath 5 made of the SiC/SiC composite material may be $B_4C$ powder, $B_4C$ pellets, or plates of Ag—In—Cd alloy, Hf metal or the like.

Ninth Embodiment

Figure 23:
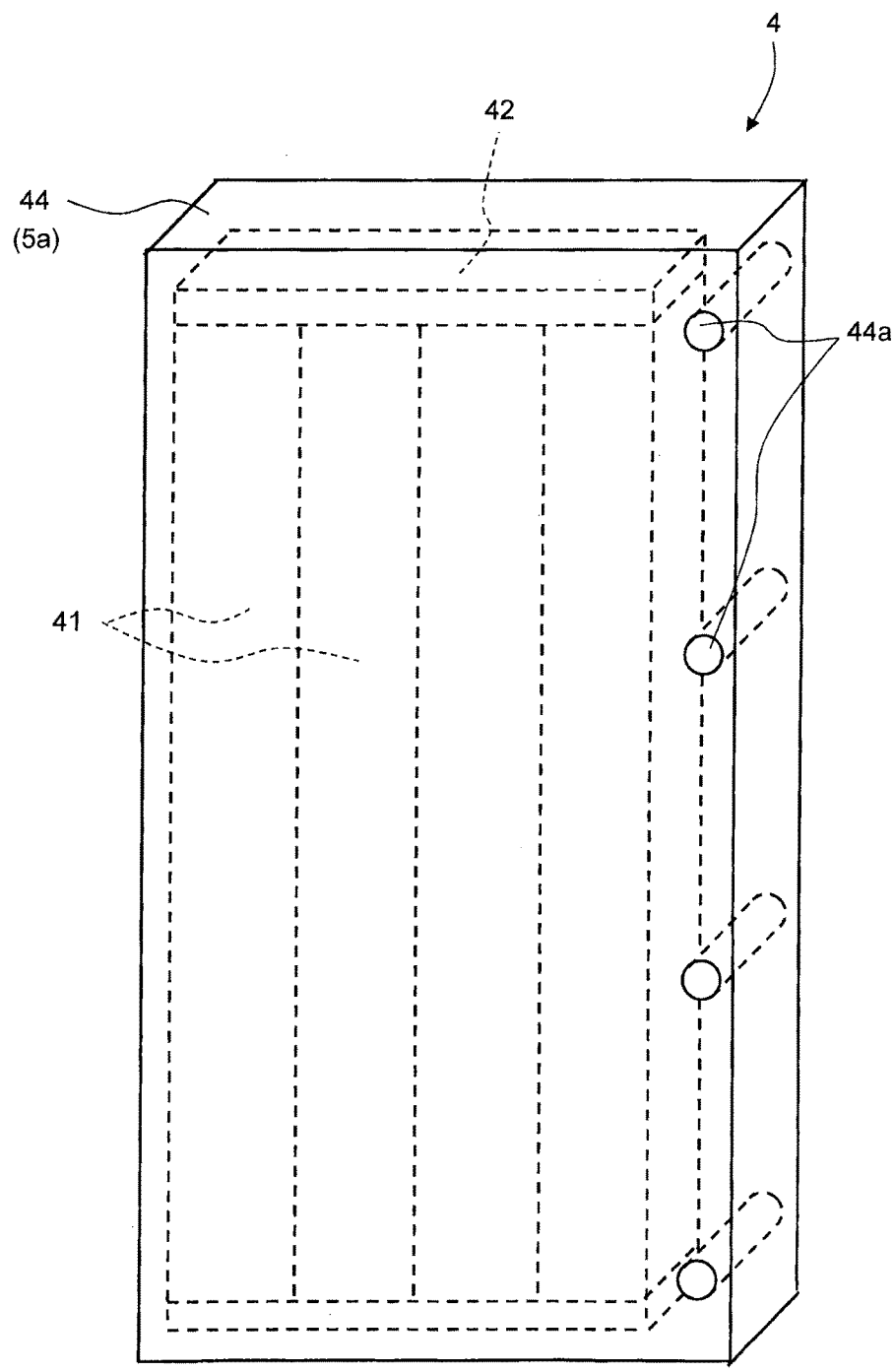
FIG. 23 is a conceptual perspective view showing the configuration of a wing section of a reactor control rod according to a ninth embodiment.

FIG. 23 is a conceptual perspective view showing the configuration of a wing section of a reactor control rod according to a ninth embodiment. The present embodiment is a variant of the first embodiment. A wing section 4 is in the shape of a flat, vertically long rectangular parallelepiped. The wing section 4 includes: a plurality of storage tubes 41; a storage-tube lid 42, which is a lid of the storage tubes 41; and a storage-tube external mold 44, which is a wing surface structural member 5a surrounding the storage tubes 41 and the storage-tube lid 42. A plurality of storage tubes 41 are arranged in parallel with one another into the shape of a flat plate.

In one side portion of the storage-tube external mold 44, a plurality of connection holes 44a, which are to be connected to the tie rod 3, are formed. The connection holes 44a are through-holes with no threads. The connection holes 44a are not limited to the through-holes. The connection holes 44a may be threaded bores, as long as the connection holes 44a can be connected to the tie rod 3.

Figure 24:
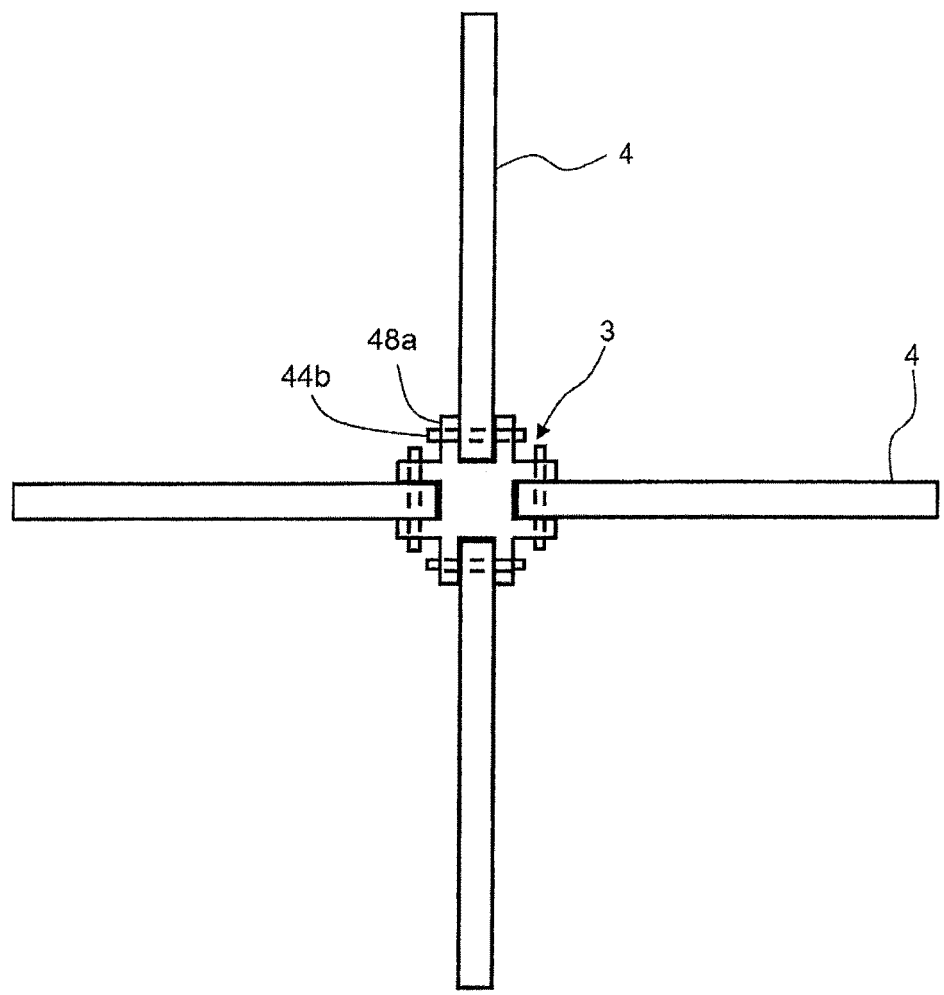
FIG. 24 is a cross-sectional view showing a connection portion of the wing sections and tie rod of the reactor control rod according to the ninth embodiment.

FIG. 24 is a cross-sectional view showing a connection portion of the wing sections and tie rod of the reactor control rod according to the ninth embodiment. On the cross-section of the tie rod 3, as shown in FIG. 24, in each of four directions that form an angle of 90 degrees with one another in the circumferential direction, a concave tie rod connection section 48a, which is to be connected to a wing section 4, is formed in such a way as to hold the sides of the wing section 4.

In two protruding portions of the concave portion of each tie rod connection section 48a, through-holes are faulted at positions corresponding to the connection holes 44a of the wing sections 4. The through-holes are used for the connection. Connection members 44b pass through the through-holes, which are formed in the tie rod connection sections 48a, and the connection holes 44a, which are formed in the storage-tube external molds 44 in such a way as to correspond to the through-holes. The connection members 44b may be a combination of a bolt, which passes through the through-hole, and a nut, which is attached to the opposite side thereof, for example. In this case, after the bolt is tightened, loosening prevention treatment is carried out between the nut and the bolt.

Although not shown in FIG. 24, the wing sections 4 and the upper end structural member 1, and the wing sections 4 and the lower end structural member 2 may be connected together in the same manner.

Figure 25:
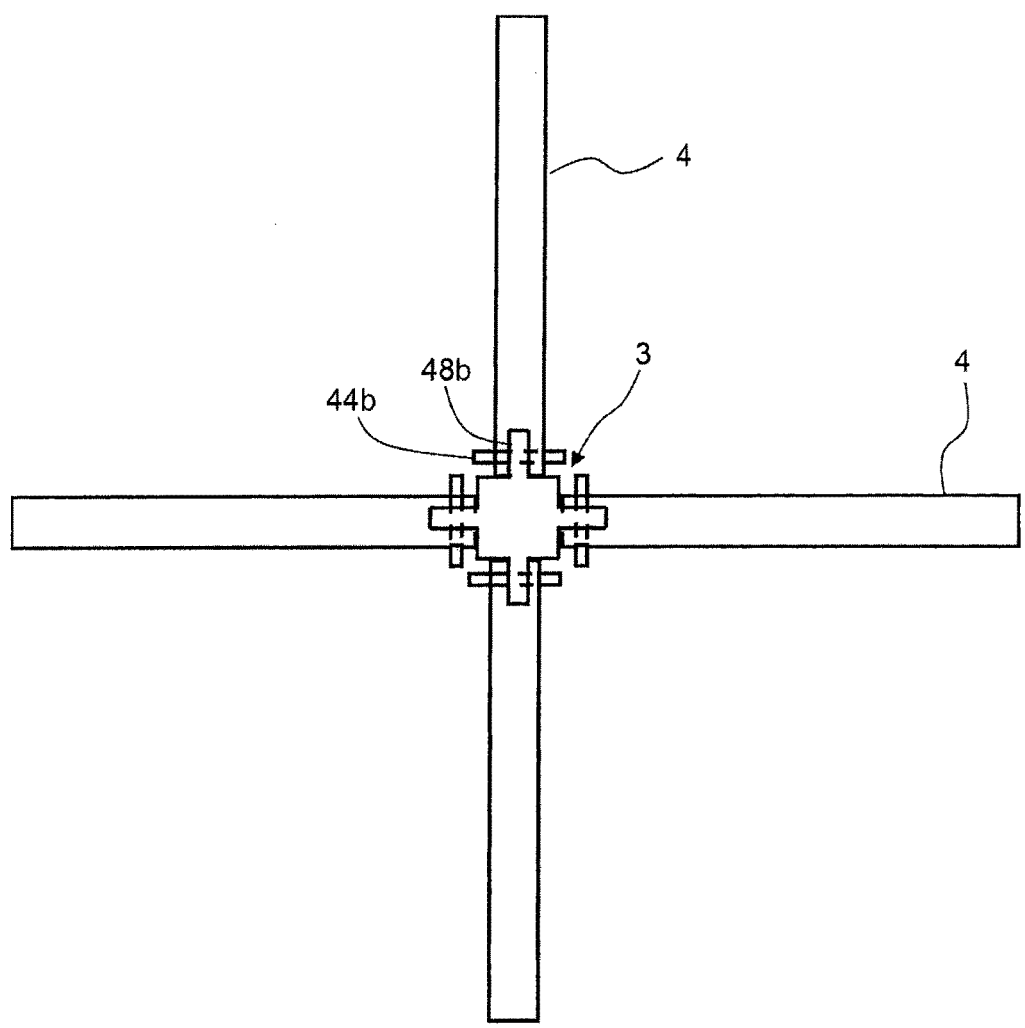
FIG. 25 is a cross-sectional view showing a modified example of the connection portion of the wing sections and tie rod of the reactor control rod according to the ninth embodiment.

FIG. 25 is a cross-sectional view showing a modified example of the connection portion of the wing sections and tie rod of the reactor control rod according to the ninth embodiment. On the cross-section of the tie rod 3, as shown in FIG. 25, wing sections in each of four directions that form an angle of 90 degrees with one another in the circumferential direction, a convex tie rod connection section 48b, which is to be connected to a wing section 4, is formed in such a way as to be inserted into between the sides of the wing section 4.

Meanwhile, one side portion of the wing section 4 is formed into a concave shape. In the concave portion formed and in the tie rod connection section 48b, through-holes, which are used to connect each other, are formed at corresponding positions. Connection members 44b pass through the through-holes, which are formed in the tie rod connection section 48b, and connection holes 44a, which are formed in the storage-tube external molds 44 in such a way as to correspond to the through-holes.

Figure 26:
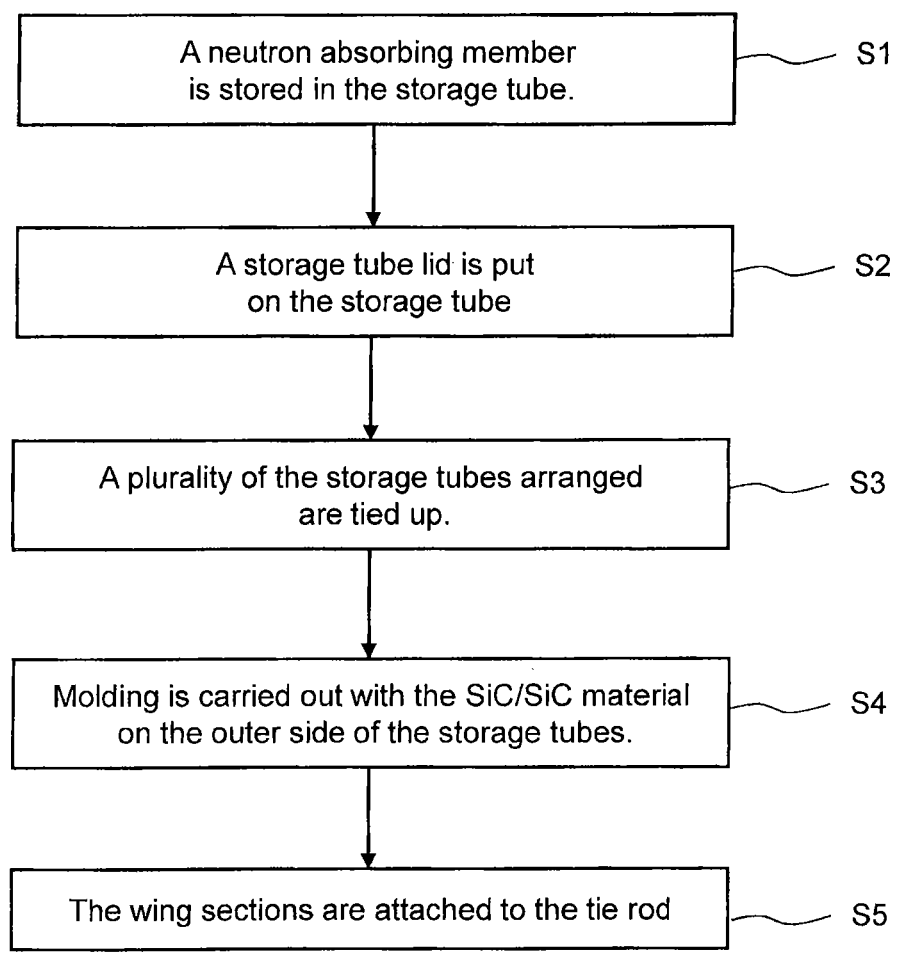
FIG. 26 is a flowchart showing the procedure of a method for producing the reactor control rod of the ninth embodiment.

FIG. 26 is a flowchart showing the procedure of a method for producing the reactor control rod of the ninth embodiment. FIG. 26 mainly shows steps that are particularly focused on a storage tube 41.

First, in the storage tube 41, a neutron absorbing member 45 (Refer to FIG. 27) is stored (Step S1). After the neutron absorbing member 45 is stored, a storage-tube lid 42 is put on the storage tube 41 (Step S2). In this manner, a plurality of storage tubes 41 in which neutron absorbing members 45 are stored are arranged parallel to the longitudinal direction into the shape of a flat plate. As a result of the arrangement, a plurality of the storage tubes 41 are in close contact with each other in planar view, and the storage tubes 41 overall are arranged in such a way as to form a rectangular shape which is within the space of awing section 4. After that, a plurality of the storage tubes 41 arranged are tied up (Step S3).

After step S3, molding is carried out with the SiC/SiC composite material on the outer sides of the storage tubes 41 that have been arranged into the shape of a flat plate, thereby adding a storage-tube external mold 44, which is awing surface structural member 5a (Step S4). The outer shape of the storage-tube external mold 44 is formed into a flat plate that extends long in one direction. In this case, a mold for the molding with the SiC/SiC composite material is shaped to produce connection holes 44a that are spaced out in one side portion of the storage-tube external mold 44.

The connection holes 44a may be formed by providing a joint area at the time of the molding with SiC/SiC composite material, and then carrying out drilling on the storage-tube external mold 44 after sintering. Alternatively, the connection holes 44a may be formed by performing molding or sintering with the use of a mold for forming threaded holes. Or the connection holes 44a may be formed by brazing, diffusion bonding, or the like. Components that need not contain the neutron absorbing member 45 or the like, such as the lower structural member, tie rod, or handle, may be formed by molding or burning with the use of short-fiber-SiC-reinforced SiC/SiC composite material or the like.

The production of the storage tubes 41, and a SiC burning process for forming the storage-tube external mold 44 through SiC/SiC molding are not limited to specific methods. An appropriate method may be selected from publicly-known methods in accordance with the strength required, constraints of the manufacturing process, or the like. For example, slurry is made by dispersing, in water or organic solvent, raw material powder, such as silicon (Si) or carbon (C). The slurry is injected into the mold, and is then dried and molded. Then, the components are formed through pressure sintering by a hot press method or the like. In this manner, this kind of production method may be used.

Mixing short-fiber SiC into the raw materials can enhance the strength of the SiC/SiC composite material. Moreover, a SiC/SiC composite material of a required shape may be formed by a pressureless sintering method that uses sintering aids as needed, a hot isostatic press (HIP) method, a chemical vapor deposition (CVD) method, a reaction sintering method, or the like. After step S4, the wing sections 4 made at step S4 are attached to the tie rod 3 (Step S5).

Figure 27:
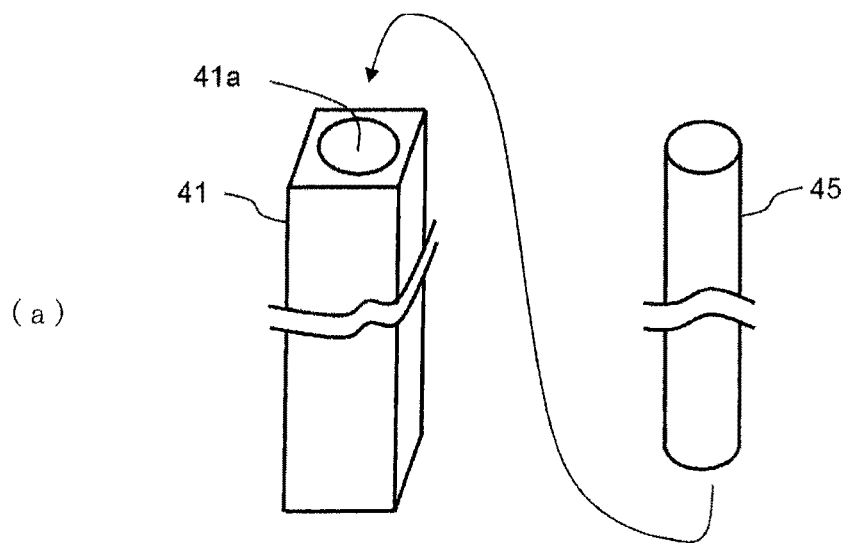
FIG. 27 is a conceptual diagram showing part of the procedure of a method for producing the reactor control rod of the ninth embodiment.
Figure 27:
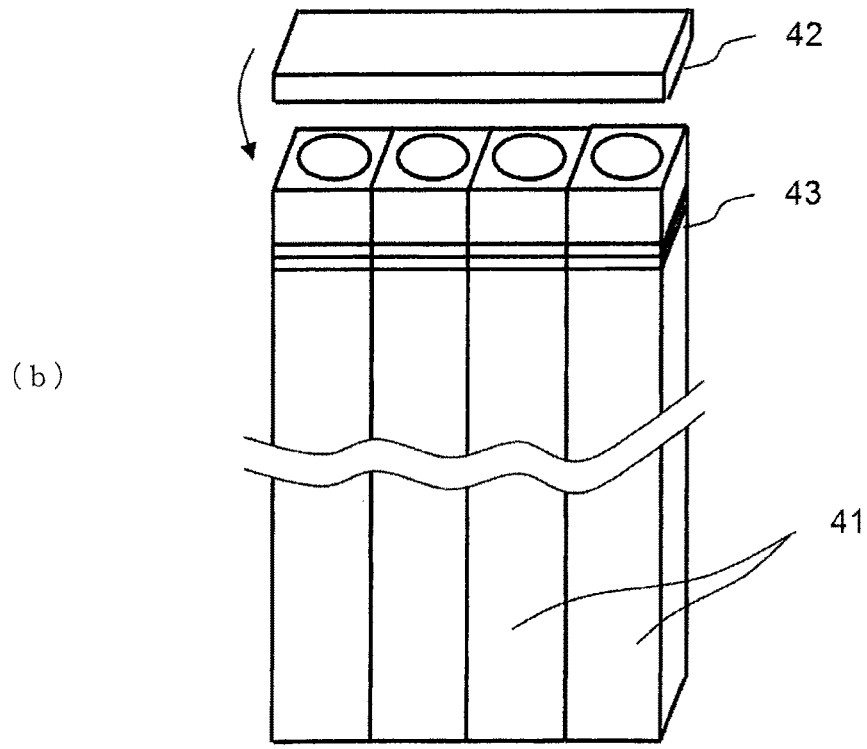

FIG. 27 is conceptual diagrams showing part of the procedure of a method for producing the reactor control rod of the ninth embodiment: FIG. 27 (a) shows step S1 of FIG. 26; and FIG. 27 (b) shows the state of steps S2 and S3 of FIG. 26.

As shown in FIG. 27 (a), the neutron absorbing member 45 is in a columnar shape. The neutron absorbing member 45 is made of a metal having a large neutron absorption cross-section. More specifically, the neutron absorbing member 45 may be made of Ag—In—Cd alloy or Hf metal, for example. The neutron absorbing member 45 is not limited to a columnar shape; the neutron absorbing member 45 may be in the shape of a polygonal column, for example.

The storage tube 41 is the outer shape of a quadrangular prism. Inside the storage tube 41, a storage section 41a, which is a vertically-long space being able to store the neutron absorbing member 45, is formed. At step S1, the neutron absorbing member 45 is stored in the storage section 41a. The storage tube 41 is made of SiC, or may be made of SiC/SiC composite material. Or, the outer shape of the storage tube 41 may be in a columnar shape.

As shown in FIG. 27 (b), the storage sections 41a in which the neutron absorbing members 45 are stored are arranged into the shape of a plate in such a way that the storage sections 41a become parallel to the longitudinal direction, and that the inlet-side surfaces of the storage sections 41a become equal in height in the same direction, and that the storage sections 41a come in close contact with each other in the horizontal direction. Then, the storage sections 41a are bound up with a storage-tube binding wire 43, which is made of SiC long fibers. The storage sections 41a may bound up with the storage-tube binding wire 43 as described above, or may be wound by a textile sheet made of SiC fibers.

After that, a common storage-tube lid 42 is placed over the inlets of the storage sections 41a of the storage tubes 41, thereby closing the inlets of all the storage sections 41a of the storage tubes 41. The storage-tube lid 42 is made of SiC, or may be made of SiC/SiC composite material.

After the storage-tube lid 42 is placed over the inlets, the storage-tube lid 42 and the storage tubes 41 are tied up. Instead of the common storage-tube lid 42, a storage-tube lid 42 may be provided for each of the storage tubes 41. Moreover, other method can be applied. For example, a male thread and a female thread are formed in the inlet of the storage section 41a of the storage tube 41, and the lid is screwed into the inlet. Alternatively, after the storage-tube lid 42 is placed over the inlets, the storage-tube lid 42 and the storage tubes 41 may be firmly bonded together by brazing, diffusion bonding, or the like if necessary.

Figure 28:
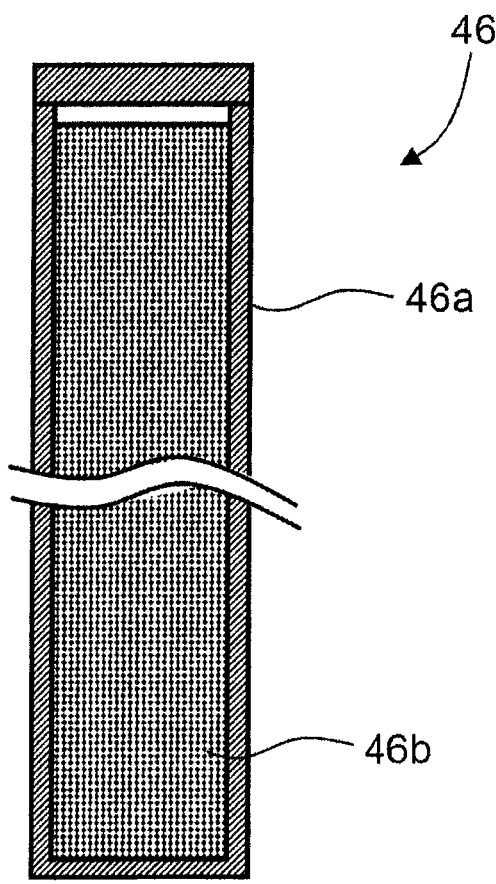
FIG. 28 is a sectional elevational view showing a first modified example of a neutron absorbing member stored in a storage tube which is a component of a wing section of a reactor control rod according to the ninth embodiment.

FIG. 28 is a sectional elevational view showing a first modified example of a neutron absorbing member stored in a storage tube which is a component of a wing section of a reactor control rod according to the ninth embodiment. A neutron absorbing member 46 includes an inner tube 46a and $B_4C$ powder 46b, which is stored in the inner tube 46a.

The inner tube 46a includes a cylindrical portion having a bottom, and a lid portion. The inner tube 46a is made of austenitic stainless steel. $B_4C$ contains $^{10}B$, which absorbs neutrons.

After the $B_4C$ powder 46b is placed inside the inner tube 46a, the lid portion is attached to the cylindrical portion of the inner tube 46a to seal. The sealing may be carried out by welding the cylindrical portion and the lid portion together.

Figure 29:
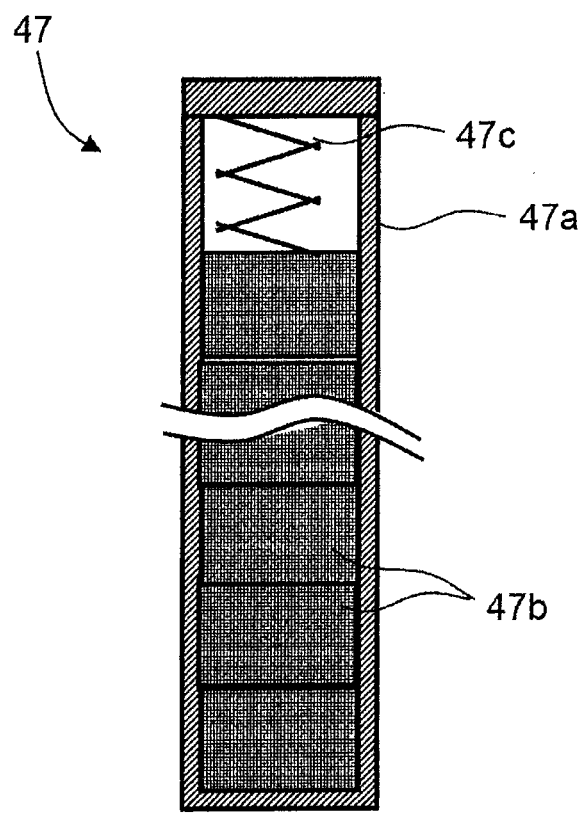
FIG. 29 is a sectional elevational view showing a second modified example of a neutron absorbing member stored in a storage tube which is a component of a wing section of a reactor control rod according to the ninth embodiment.

FIG. 29 is a sectional elevational view showing a second modified example of a neutron absorbing member stored in a storage tube which is a component of a wing section of a reactor control rod according to the ninth embodiment. A neutron absorbing member 47 includes an inner tube 47a; $B_4C$ pellets 47b, which are stored in the inner tube 47a; and a spring 47c, which is placed in an end portion of the inner tube 47a and restricts the movement of the $B_4C$ pellets 47b.

The $B_4C$ pellets 47b is filled in the space of the inner tube 47a except for some space. That is, in order to suppress an extreme rise of the internal pressure caused by gas generated through a reaction between neutrons and boron, the inner tube 47a is filled with the $B_4C$ pellets 47b in such a way as to form a plenum. In the plenum, the spring 47c is disposed.

The position of the spring 47c is not limited to the end portion. The spring 47c may be placed between the $B_4C$ pellets 47b. Springs 47c may be provided in a plurality of locations.

The present embodiment and first and second modified examples with the above-described configurations can achieve advantageous effects described below.

A plurality of storage tubes 41 are arranged among the components of the wing section 4. In each storage tube 41, the neutron absorbing member 46 or 47 is independently stored. Accordingly, even if one of the storage tubes 41 is damaged, this damage is unlikely to affect the neutron absorbing members 46 or 47 stored in the other storage tubes 41.

Moreover, before the molding of SiC/SiC is carried out, the storage tubes 41 are bundled together with the storage-tube binding wire 43 or a textile sheet made of SiC fibers in order to keep the positional relation between the storage tubes 41. Therefore, the shape of the reactor control rod 50 can be maintained. As a result, it is possible to improve the strength of the control rod and to maintain the neutron absorption function in the reactor core even under a high-temperature state of the reactor core in the event of an accident.

And, before the molding is performed, the storage-tube lid 42 is mounted on the storage tubes 41. Therefore, it is possible to prevent intrusion of SiC raw materials into the storage sections 41*a* of the storage tubes 41.

Figure 30:
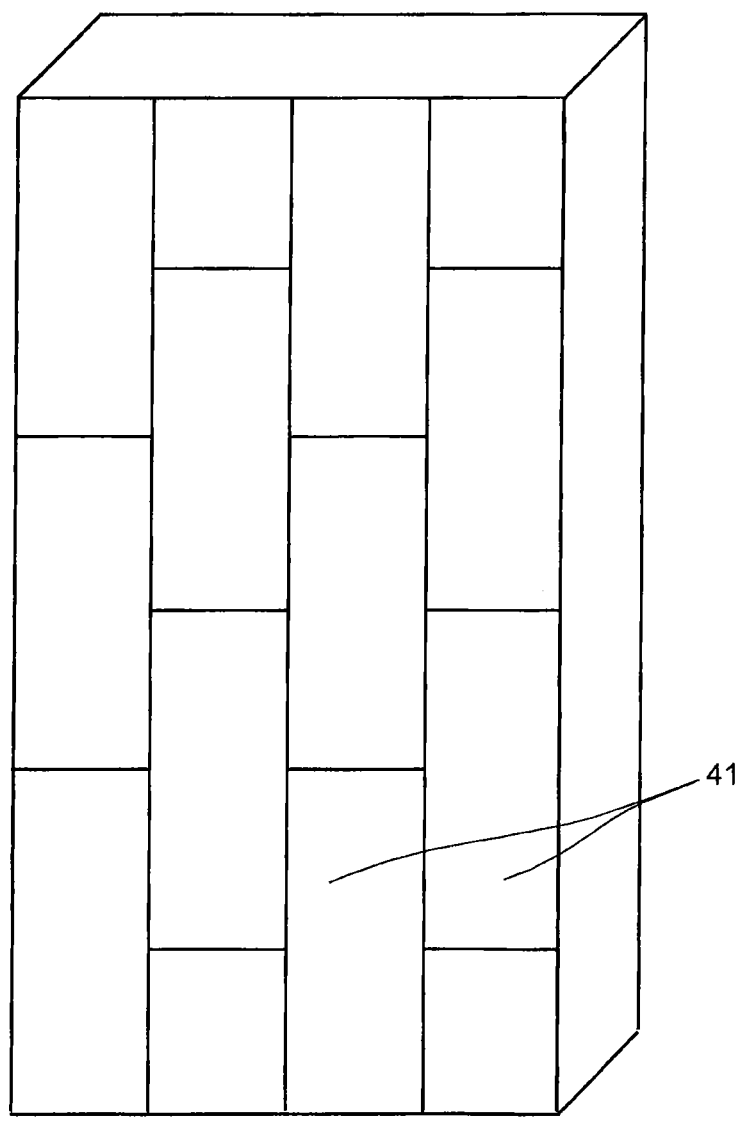
FIG. 30 is a perspective view showing a first modified example of the arrangement of storage tubes of a wing section of a reactor control rod according to the ninth embodiment.

FIG. 30 is a perspective view showing a first modified example of the arrangement of storage tubes of a wing section of a reactor control rod according to the ninth embodiment. Each of the storage tubes 41 shown in FIG. 23 is one long storage tube that extends in the longitudinal direction of the wing section 4. In this modified example, storage tubes 41 of appropriate length are arranged in the longitudinal direction of a wing section 4. In this manner, by setting the length of the storage tubes 41 to an appropriate length, conditions of production variances of the storage tubes 41 can be diversified. Moreover, since the amounts of neutron absorbing members stored in the storage tubes 41 have been spread, the effects resulting from one storage tube 41 damaged can be reduced.

Figure 31:
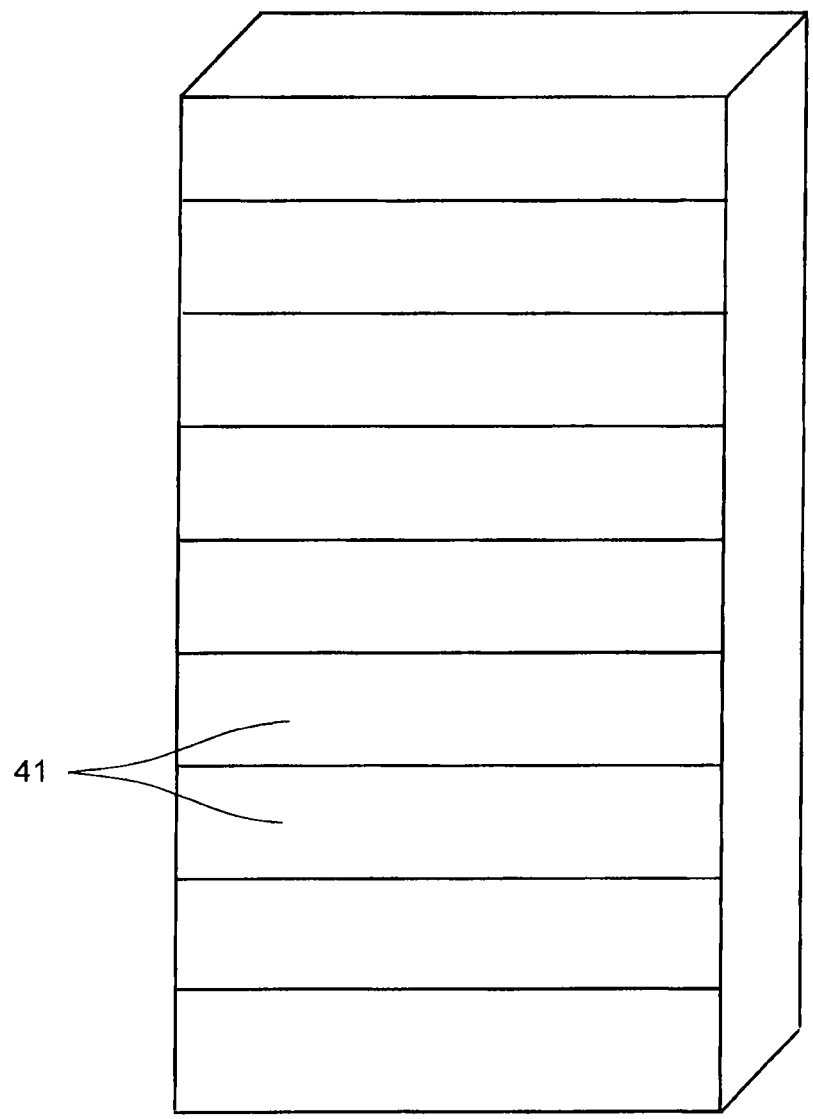
FIG. 31 is a perspective view showing a second modified example of the arrangement of storage tubes of a wing section of a reactor control rod according to the ninth embodiment.

FIG. 31 is a perspective view showing a second modified example of the arrangement of storage tubes of a wing section of a reactor control rod according to the ninth embodiment. In this modified example, storage tubes 41 are arranged in a direction perpendicular to the longitudinal direction of the wing section 4. When the storage tubes 41 are arranged in the direction perpendicular to the longitudinal direction of the wing section 4, the strength of the wing section 4 is enhanced in the direction perpendicular to the longitudinal direction of the wing section 4. Therefore, this modified example is effective for cases where a bending load is applied in the direction perpendicular to the longitudinal direction of the wing section 4.

Figure 32:
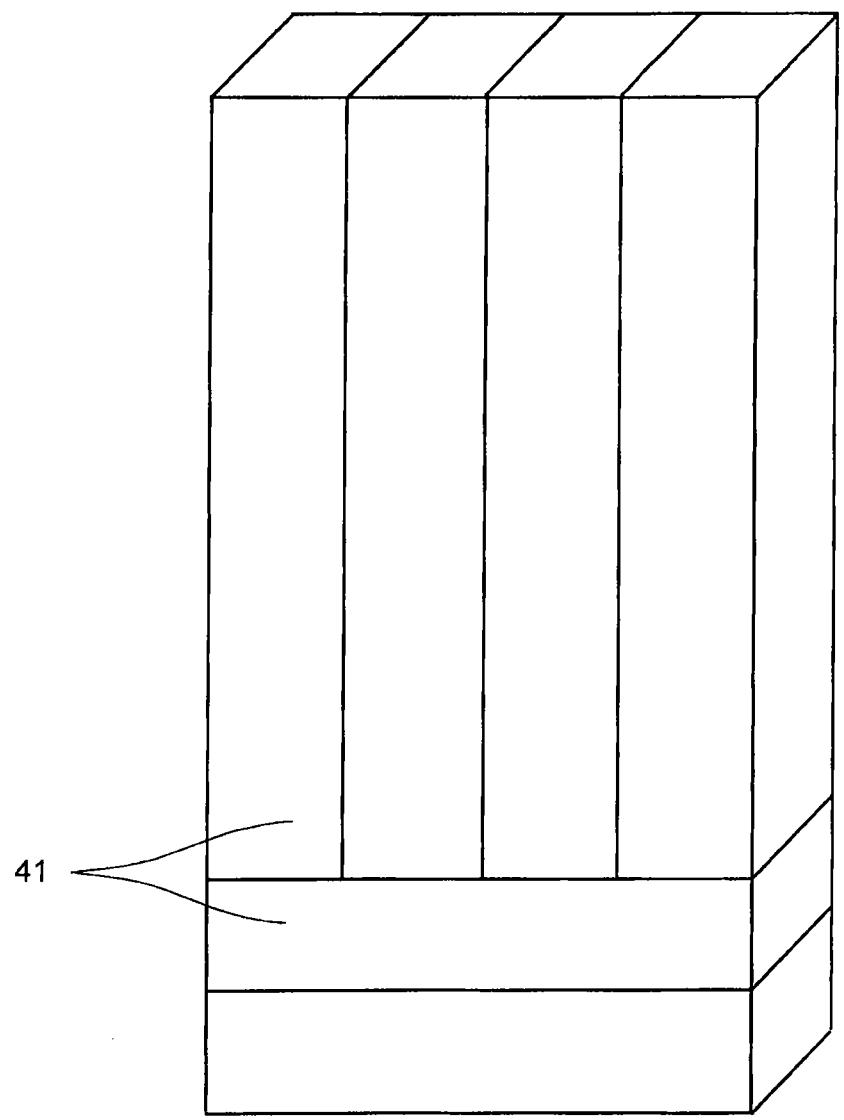
FIG. 32 is a perspective view showing a third modified example of the arrangement of storage tubes of a wing section of a reactor control rod according to the ninth embodiment.

FIG. 32 is a perspective view showing a third modified example of the arrangement of storage tubes of a wing section of a reactor control rod according to the ninth embodiment. In this modified example, a group of storage tubes 41 arranged in the longitudinal direction of the wing section 4 and a group of storage tubes 41 arranged in the direction perpendicular to the longitudinal direction of the wing section 4 are put together. In this manner, that a group of storage tubes 41 arranged in the longitudinal direction of the wing section 4 and a group of storage tubes 41 arranged in the direction perpendicular to the longitudinal direction of the wing section 4 are put together can ensure the strength of the wing section 4 in any of the direction perpendicular to the longitudinal direction of the wing section 4.

Other Embodiments

The present invention is described above by way of several embodiments. However, the embodiments are presented only as examples without any intention of limiting the scope of the present invention.

For example, in the embodiments, there are four wing sections 4, and the wing sections 4 are arranged in such a way as to form an angle of 90 degrees with each other in the circumferential direction. However, the present invention is not limited to four wing sections and 90 degrees. The present invention can be applied even when a plurality of wing sections 4 are arranged in such a way as to form any angle other than 90 degrees in the circumferential direction. Moreover, BWR has been described as an example. However, the present invention is not limited to BWR as long as the same configuration and advantageous effects can be achieved.

Furthermore, different modes of carrying out the present invention may be employed for the above-described embodiments.

For example, the features of the eight embodiment, which is characterized by the use of the SiC/SiC composite material for sealing the side of the sheath 5 that is to be joined to the tie rod 3, and the features of one of the second to seventh embodiments may be used in combination.

One control rod may contain a plurality of kinds of neutron absorbing members 10. That is, for example, as the neutron absorbing members 10, the Hf plate 6, $B_4C$ powder 18, $B_4C$ pellet 23, and the like may be used in each wing, and these components may be used in combination.

In the embodiments, as substances that absorb neutrons, Hf and B have been described as an example. However, the present invention is not limited to these substances. For example, gadolinium (Gd), tungsten (W), and the like may be used. Besides the metal, hydrides or oxides of those substances or the like may also be available as long as the substances are stable in the reactor core and compatible with reactor coolants and the like. Moreover, these substances may be used in combination.

The embodiments may be embodied in other various forms. Various omissions, replacements and changes may be made without departing from the subject-matter of the invention.

The above embodiments and variants thereof are within the scope and subject-matter of the invention, and are similarly within the scope of the invention defined in the appended claims and the range of equivalency thereof.

EXPLANATION OF REFERENCE SYMBOLS

1: end structural member, 2: lower end structural member, 3: tie rod, 3*a*: tie cross, 4: wing section, 5: sheath, 5*a*: wing surface structural member, 5*b*: sealing section, 6: Hf plate, 8: roller, 9: handle, 10: neutron absorption member, 11: frame, 12: bolt, 13: nut, 14: brazing section, 15, 15*a*: diffusion bonding section, 16,16*a*,16*b*, 16*c*: SiC fiber, 17: SiC/SiC composite material sheet, 18: B4C powder, 19: metal ball, 21*a*: upper end plug, 21*b*: lower end plug, 22: iron wool, 23: B4C pellets, 24: spring, 25: cladding tube, 26: speed limiter, 27: ball stop, 30: absorber tube, 41: storage tubes; 41*a*: storage section, 42: storage-tube lid, 43: storage-tube binding wire, 44: storage-tube external mold, 44*a*: connection hole, 44*b*: Connection member, 45: neutron absorption member, 46: neutron absorption member, 46*a*: inner tube, 46*b*: B4C powder, 47: neutron absorption member, 47*a*: inner tube; 47*b*: B4C pellet, 47*c*: spring, 48*a*,48*b*: convex tie rod connection section, 50: reactor control rod, 100: fuel assembly, 101: channel box, 102: fuel rod

The invention claimed is:

1. A nuclear reactor control rod comprising:
a plurality of wing sections arranged radially around an axis extending in vertical direction in such a way as to be disposed with spaces therebetween in a circumferential direction, each of the wing sections being a flat plate spreading in a direction of the axis and in a radial direction, each of the wing sections including a plurality of storage tubes made of SiC material or SiC-fiber-reinforced SiC composite material, the storage tubes being arranged in parallel with one another in a flat plane, and the storage tubes containing a neutron absorbing member containing a neutron absorbing material, each of the wing sections including a wing surface structural member formed by molding of SiC-fiber-reinforced SiC composite material in such a way as to cover surfaces of the plurality of the storage tubes and formed to have an outward shape of a flat plate; and
a central joint section made of SiC material or SiC-fiber-reinforced SiC composite material, the central joint section bundling the plurality of wing sections together at center, wherein
the plurality of storage tubes are bundled together with fibers made of SiC or a textile made of SiC.

2. The nuclear reactor control rod according to claim 1, wherein
orientation directions of SiC fibers in the SiC-fiber-reinforced SiC composite material is such that arithmetic mean of $\cos^2 \theta$ for all fibers is ½ or greater, where $\theta$ is the angle formed with the longitudinal direction of each fiber of the wing section.

3. The nuclear reactor control rod according to claim 2, wherein
SiC fibers in the SiC-fiber-reinforced SiC composite material are oriented in two directions, one group is oriented in axial direction and the other group is oriented in a direction perpendicular to the axial direction.

4. The nuclear reactor control rod according to claim 2, wherein
the SiC-fiber-reinforced SiC composite material includes a reinforced sheet where arithmetic mean of $\cos^2 \theta$ for all SiC fibers of the reinforced sheet is adjusted to be greater than or equal to ½.

5. The nuclear reactor control rod according to claim 1, wherein:
the neutron absorbing member includes a plurality of rod-shaped absorbers each comprising a cladding tube made of SiC-fiber-reinforced SiC composite material, the rod shaped absorbers being arranged inside the wing surface structural member, and the cladding tubes containing the neutron absorbing material; and
orientation directions of the SiC fibers in the SiC-fiber-reinforced SiC composite material used for each cladding tube is such that the arithmetic mean of $\cos^2 \varphi$ for all fibers is ½ or greater, where $\varphi$ is an angle that each fiber of the cladding tube form with the circumferential direction of the cladding tube.

6. The nuclear reactor control rod according to claim 1, wherein
the neutron absorbing member includes a plurality of inner tubes, each of the inner tubes being stored in each of the storage tubes, each of the inner tubes containing the neutron absorbing material, each of the inner tubes being sealed at upper end and lower end.

7. The nuclear reactor control rod according to claim 1, wherein
the neutron absorbing material includes $B_4C$.

8. The nuclear reactor control rod according to claim 1, wherein
the neutron absorbing material includes Hf or Hf alloy.

9. The nuclear reactor control rod according to claim 1, wherein each of the wing sections and central joint section are connected to each other with a bolt made of the SiC/SiC composite material and a nut made of the SiC/SiC composite material.

10. The nuclear reactor control rod according to claim 1, wherein each of the wing sections and the central joint section are joined together by diffusion bonding.

* * * * *